(12) United States Patent
Choi et al.

(10) Patent No.: US 11,869,213 B2
(45) Date of Patent: Jan. 9, 2024

(54) ELECTRONIC DEVICE FOR ANALYZING SKIN IMAGE AND METHOD FOR CONTROLLING THE SAME

(71) Applicant: SAMSUNG ELECTRONICS CO., LTD., Suwon-si (KR)

(72) Inventors: Hyoungseon Choi, Suwon-si (KR); Youngjae Oh, Suwon-si (KR); Sangkyung Lee, Suwon-si (KR); Taehan Jeon, Suwon-si (KR); Changhwan Choi, Suwon-si (KR); Joonho Kim, Suwon-si (KR); Jinhong Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 395 days.

(21) Appl. No.: 17/142,878

(22) Filed: Jan. 6, 2021

(65) Prior Publication Data
US 2021/0224518 A1 Jul. 22, 2021

(30) Foreign Application Priority Data

Jan. 17, 2020 (KR) .................. 10-2020-0006458
Aug. 7, 2020 (KR) .................. 10-2020-0098991

(51) Int. Cl.
*H04N 23/56* (2023.01)
*H04N 23/661* (2023.01)
(Continued)

(52) U.S. Cl.
CPC ............... *G06T 7/73* (2017.01); *G06T 3/40* (2013.01); *G06T 3/60* (2013.01); *G06T 7/50* (2017.01);
(Continued)

(58) Field of Classification Search
CPC ........... G06T 2207/30088; G06T 7/521; G06T 7/593; G06T 7/77; G06T 2207/10028;
(Continued)

(56) References Cited

U.S. PATENT DOCUMENTS 8,606,735 B2 * 12/2013 Cho ................. G10L 15/22
715/767
9,262,028 B2 * 2/2016 Ahn ................ G06F 3/04186
(Continued)

FOREIGN PATENT DOCUMENTS

JP 2009-223566 A 10/2009
JP 2015-106252 A 6/2015
(Continued)

OTHER PUBLICATIONS

International Search Report (PCT/ISA/210) issued by the International Searching Authority in International Application No. PCT/KR2021/000618, dated Apr. 26, 2021.
(Continued)

*Primary Examiner* — Philip P. Dang
(74) *Attorney, Agent, or Firm* — Sughrue Mion, PLLC

(57) ABSTRACT

An electronic device including a display; a distance sensor; a camera; and at least one processor configured to: obtain a two-dimensional (2D) face image of a user via the camera and obtain distance sensing data via the distance sensor; identify a distance between the user and the electronic device, and a rotation angle of a face of the user with respect to the electronic device, using the obtained 2D face image and the obtained distance sensing data; modify at least a part of the 2D face image based on at least one of the identified distance and the identified rotation angle; and provide information about at least the part of the modified 2D face image via the display.

8 Claims, 33 Drawing Sheets

(51) Int. Cl.
  *G06T 7/73* (2017.01)
  *G06T 3/60* (2006.01)
  *G06T 3/40* (2006.01)
  *G06T 7/50* (2017.01)
  *G06T 7/62* (2017.01)
  *G06V 40/16* (2022.01)
  *H04N 23/60* (2023.01)

(52) U.S. Cl.
  CPC .............. *G06T 7/62* (2017.01); *G06V 40/161* (2022.01); *G06V 40/166* (2022.01); *G06V 40/171* (2022.01); *H04N 23/64* (2023.01); *G06T 2207/30201* (2013.01)

(58) Field of Classification Search
  CPC . G06T 2207/20072; G06T 2207/20076; G06T 2207/10016; G06T 2207/10021; G06T 2207/30201; G06T 7/73; G06T 3/40; G06T 3/60; G06V 2201/03; G06V 40/166; G06V 40/171; H04N 23/634; H04N 23/661; H04N 23/74; H04N 23/56; H04N 23/611; H04N 23/64
  See application file for complete search history.

(56) References Cited

U.S. PATENT DOCUMENTS

| | | | |
|---|---|---|---|
| 9,813,629 B2* | 11/2017 | Lee | H04N 23/66 |
| 9,979,869 B2* | 5/2018 | Park | H04N 23/6812 |
| 10,114,342 B2* | 10/2018 | Kim | G04C 17/0091 |
| 10,165,199 B2* | 12/2018 | Zhang | G06V 40/67 |
| 10,209,779 B2* | 2/2019 | Roh | G06F 1/163 |
| 10,250,857 B2* | 4/2019 | Kim | H04B 10/40 |
| 10,275,020 B2* | 4/2019 | Cohen | G06F 3/04815 |
| 10,319,086 B2* | 6/2019 | Lee | G06T 5/006 |
| 10,346,601 B2* | 7/2019 | Yun | G06F 21/32 |
| 10,423,978 B2* | 9/2019 | Huang | G06Q 30/0269 |
| 10,438,035 B2* | 10/2019 | D'Ercoli | G06V 20/64 |
| 10,467,933 B2* | 11/2019 | Hur | H04N 21/44218 |
| 10,534,900 B2* | 1/2020 | Cheong | A61B 5/0022 |
| 10,540,013 B2* | 1/2020 | Ryu | G06F 3/017 |
| 10,632,623 B2* | 4/2020 | Shim | B25J 11/001 |
| 10,635,902 B2* | 4/2020 | Lee | G06V 20/17 |
| 10,695,033 B2* | 6/2020 | Hyun | A61B 8/5246 |
| 10,754,150 B2* | 8/2020 | Chung | G09F 9/30 |
| 10,785,422 B2* | 9/2020 | Ortiz Egea | G06V 40/172 |
| 10,853,625 B2* | 12/2020 | McCombe | G06V 10/758 |
| 10,860,033 B2* | 12/2020 | Park | G05D 1/0238 |
| 11,006,135 B2* | 5/2021 | Fukuyasu | H04N 19/597 |
| 11,127,380 B2* | 9/2021 | Beith | G02B 27/0172 |
| 11,182,769 B2* | 11/2021 | Oh | G06Q 20/321 |
| 11,407,106 B2* | 8/2022 | Kim | B25J 9/1679 |
| 11,440,408 B2* | 9/2022 | Won | B60K 35/00 |
| 11,494,897 B2* | 11/2022 | Wiley | A61B 3/112 |
| 2006/0238642 A1 | 10/2006 | Goto | |
| 2008/0074536 A1 | 3/2008 | Tamura | |
| 2015/0145408 A1 | 5/2015 | Kuroda | |
| 2015/0146987 A1 | 5/2015 | Tang et al. | |
| 2016/0093081 A1* | 3/2016 | Kim | G06F 3/167 345/156 |
| 2017/0340267 A1 | 11/2017 | Shen et al. | |
| 2019/0012784 A1* | 1/2019 | Wiley | G06T 7/74 |
| 2019/0392597 A1 | 12/2019 | Feng et al. | |
| 2020/0383629 A1 | 12/2020 | Yoo et al. | |

FOREIGN PATENT DOCUMENTS

| | | |
|---|---|---|
| JP | 6406966 B2 | 10/2018 |
| KR | 10-2012-0014794 A | 2/2012 |
| KR | 10-2016-0016717 A | 2/2016 |
| KR | 10-2018-0103672 A | 9/2018 |
| KR | 10-1923405 B1 | 11/2018 |

OTHER PUBLICATIONS

Written Opinion (PCT/ISA/237) issued by the International Searching Authority in International Application No. PCT/KR2021/000618, dated Apr. 26, 2021.

* cited by examiner

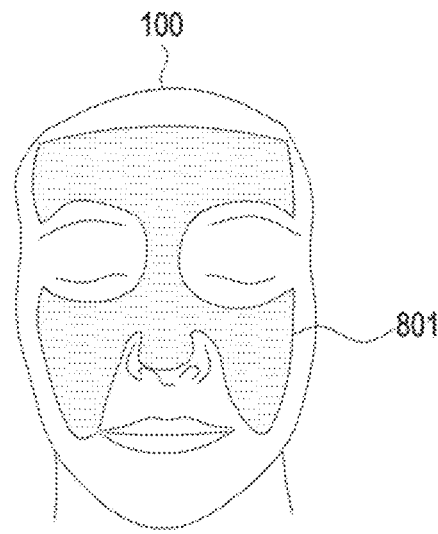
FIG.8B
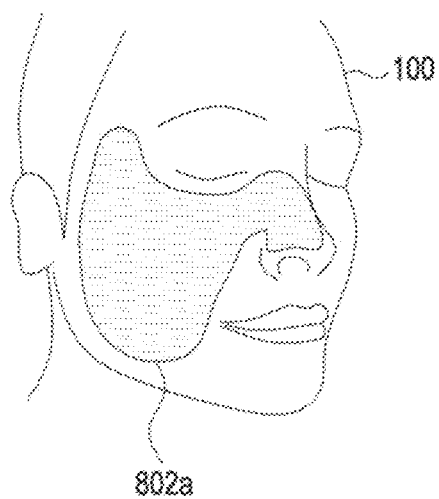 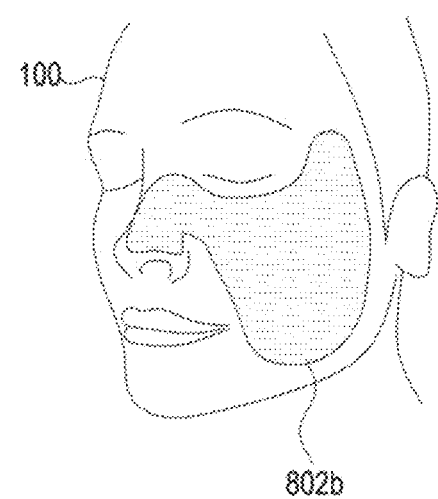
FIG.8C  FIG.8D

ELECTRONIC DEVICE FOR ANALYZING SKIN IMAGE AND METHOD FOR CONTROLLING THE SAME

CROSS-REFERENCE TO RELATED APPLICATION(S)

This application is based on and claims priority under 35 U.S.C. § 119 to Korean Patent Application No. 10-2020-0006458, filed on Jan. 17, 2020, in the Korean Intellectual Property Office, and Korean Patent Application No. 10-2020-0098991, filed on Aug. 7, 2020, in the Korean Intellectual Property Office, the disclosures of which are herein incorporated by reference in their entirety.

BACKGROUND

1. Field

The disclosure relates to electronic devices for analyzing skin images and methods for controlling the same, and more particularly to a device for analyzing skim images of a user by modifying a two-dimensional image of the user's face.

2. Description of Related Art

More and more services and additional functions are being provided via electronic devices, e.g., smart mirrors. For example, a user may carry out diagnosis on her skin via an electronic device, e.g., a smart mirror. As such, steadily increasing demand for home skin diagnosis and beauty devices calls for technology for skin analysis.

SUMMARY

According to an aspect of the disclosure, an electronic device may include a display; a distance sensor; a camera; and at least one processor configured to: obtain a two-dimensional (2D) face image of a user via the camera and obtain distance sensing data via the distance sensor; identify a distance between the user and the electronic device, and a rotation angle of a face of the user with respect to the electronic device, using the obtained 2D face image and the obtained distance sensing data; modify at least a part of the 2D face image based on at least one of the identified distance and the identified rotation angle; and provide information about at least the part of the modified 2D face image via the display.

The processor may be further configured to identify the rotation angle using a difference in distance between a first feature point connection line and a second feature point connection line.

The processor may be further configured to modify at least part of the face of the user in the 2D face image in such a manner as to multiply a size of at least a portion of the face of the user by a correction coefficient predetermined according to the identified distance.

The distance between the user and the electronic device may correspond to a distance between the electronic device and a nose tip of the face of the user.

The processor may be further configured to identify a direction of the rotation angle of the face of the user.

The electronic may further include a light source. The processor may be further configured to control an output of the light source based on the identified direction of the rotation angle of the face of the user.

The processor may be further configured to provide a guide with a predetermined size to obtain the 2D face image via the display.

The processor may be further configured to identify a size of the face of the user and change the size of the guide according to the identified size of the face of the user.

The distance sensor may include a time-of-flight (ToF) sensor, and the processor may be further configured to: obtain a three-dimensional (3D) shape of the user's face using the distance sensing data obtained via the ToF sensor; and modify a brightness of the obtained 2D face image based on the 3D shape of the face of the user.

The processor may be further configured to identify a volume of the face of the user based on the 3D shape of the face of the user and provide a predetermined guide based on the identified volume.

According to another aspect of the disclosure, a method for controlling an electronic device, the method may include obtaining a 2D face image of a user via a camera of the electronic device; obtaining distance sensing data via a distance sensor of the electronic device; identifying a distance between the user and the electronic device, and a rotation angle of a face of the user with respect to the electronic device, using the obtained 2D face image and the obtained distance sensing data; modifying at least a part of the 2D face image based on at least one of the identified distance and the identified rotation angle; and providing information about at least the part of the modified 2D face image via a display.

Identifying the rotation angle may include identifying the rotation angle using a difference in distance between a first feature point connection line and a second feature point connection line.

Modifying the at least part of the 2D face image may include modifying at least part of the face of the user in the 2D face image in such a manner as to multiply a size of at least a portion of the face of the user by a correction coefficient predetermined according to the identified distance.

The distance between the user and the electronic device may correspond to a distance between the electronic device and a nose tip of the face of the user.

The method may further include identifying a direction of rotation of the face.

The electronic device may further include a light source. The method may further include controlling an output of the light source based on the identified direction of the rotation angle of the face of the user.

The method may further include providing a guide with a predetermined size to obtain the 2D face image via the display.

The method may further include identifying a size of the face of the user; and changing the size of the guide according to the identified size of the face of the user.

The distance sensor may include a ToF sensor, and the method may further include obtaining a three-dimensional (3D) shape of the face of the user using the distance sensing data obtained via the ToF sensor; and modifying a brightness of the obtained 2D face image using the 3D shape of the face of the user.

The method may further include identifying a volume of the face of the user using the 3D shape of the face of the user; and providing a predetermined guide based on the identified volume.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8B is a diagram showing a front facing skin analysis area according to an embodiment;

FIG. 8C is a diagram showing a right facing skin analysis area according to an embodiment;

FIG. 8D is a diagram showing a left facing skin analysis area according to an embodiment;

Throughout the drawings, like reference numerals will be understood to refer to like parts, components, and structures.

DETAILED DESCRIPTION

Figure 1A:
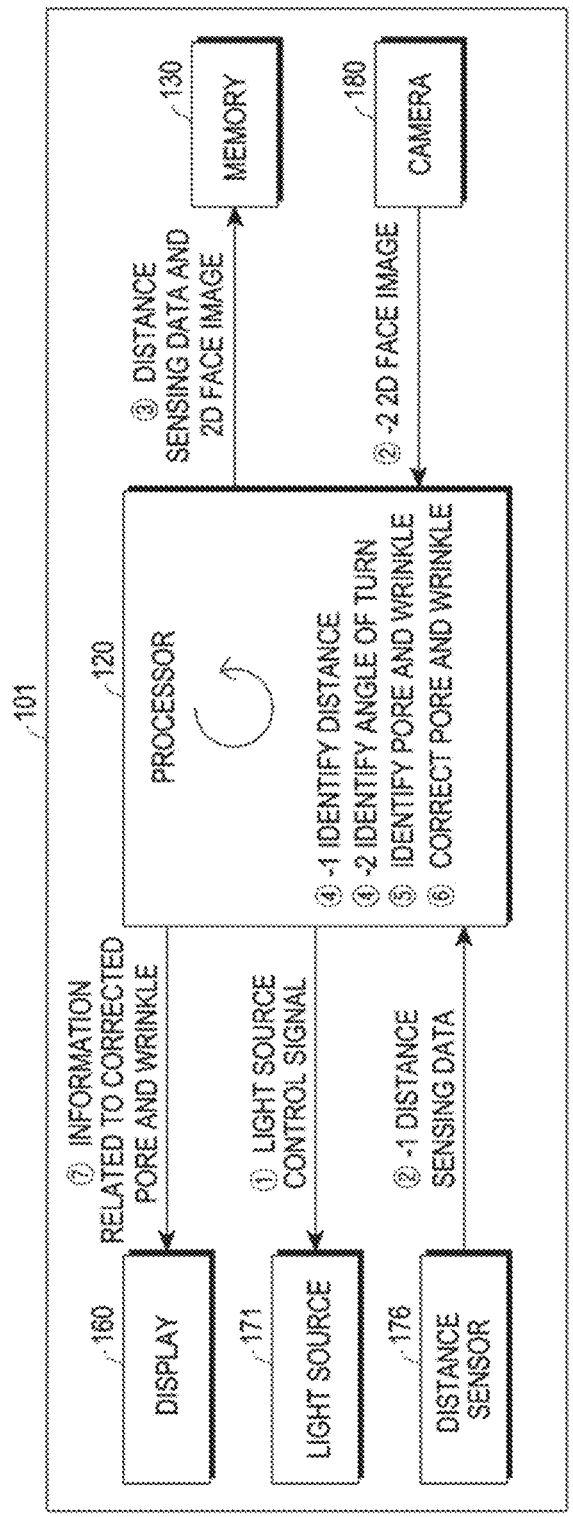
FIG. 1A is a diagram of the operation of an electronic device according to an embodiment.

The present disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, a detailed description of known functions or configurations incorporated herein will be omitted as it may make the subject matter of the present disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the disclosure, an expression "A or B", "at least one of A and/or B", "one or more of A and/or B", or the like, may include all possible combinations of items listed together. For example, "A or B", "at least one of A and B", or "at least one of A or B" may refer to all cases (1) including at least one A, (2) including at least one B, or (3) including both at least one A and at least one B.

Expressions "first", "second", and the like, used in the disclosure may indicate various components regardless of a sequence and/or importance of the components, will be used only in order to distinguish one component from the other components, and do not limit the corresponding components.

When it is mentioned that any component (e.g., a first component) is (operatively or communicatively) coupled with/to or is connected to another component (e.g., a second component), it is to be understood that any component is directly coupled with/to another component or may be coupled with/to another component through the other component (e.g., a third component). On the other hand, when it is mentioned that any component (e.g., a first component) is "directly coupled with/to" or "directly connected to" to another component (e.g., a second component), it is to be understood that the other component (e.g., a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware. Instead, in any context, an expression "a device configured to" may mean that the device is "capable of" together with other devices or components. For example, a "sub-processor configured (or set) to perform A, B, and C" may mean a dedicated processor (e.g., an embedded processor) for performing the corresponding operations or a generic-purpose processor (for example, a central processing unit (CPU) or an application processor) that may perform the corresponding operations by executing one or more software programs stored in a memory device.

A term "user" may refer to a person that uses an electronic device or an apparatus (e.g., an artificial intelligence electronic device) that uses the electronic device. Hereinafter, the disclosure will be described in more detail with reference to the drawings.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Regarding an electronic device for skin condition analysis based on captured skin images, precise skin condition analysis requires information about pores and wrinkles with an appropriate size. When the size of pores and wrinkles captured is excessively large or small, it may be hard to precisely analyze the skin. This means that an appropriate distance must be maintained between the user's face and an electronic device performing skin analysis so as to guarantee accurate skin analysis. In performing analysis on the user's skin, capturing may be carried out, with the user's face turned at a certain angle, rather than facing straight ahead. In such a case, capturing may be done with the size of pores or the length of wrinkles distorted due to the face's turn, rendering it difficult to precisely analyze the skin.

According to various embodiments, an electronic device may be capable of obtaining the same skin information based on images captured at different distances. That is, when the distance between the user's face and the electronic device performing skin analysis is larger or smaller than the above described distance that provides accurate skin analysis, the electronic device may obtain skin analysis similar to the analysis provided from the above described distance.

According to various embodiments, an electronic device may be capable of obtaining the same skin information as is obtained when the user's face faces straight ahead at the electronic device, even when the user's face faces a certain angle away from the electronic device.

Figure 1B:
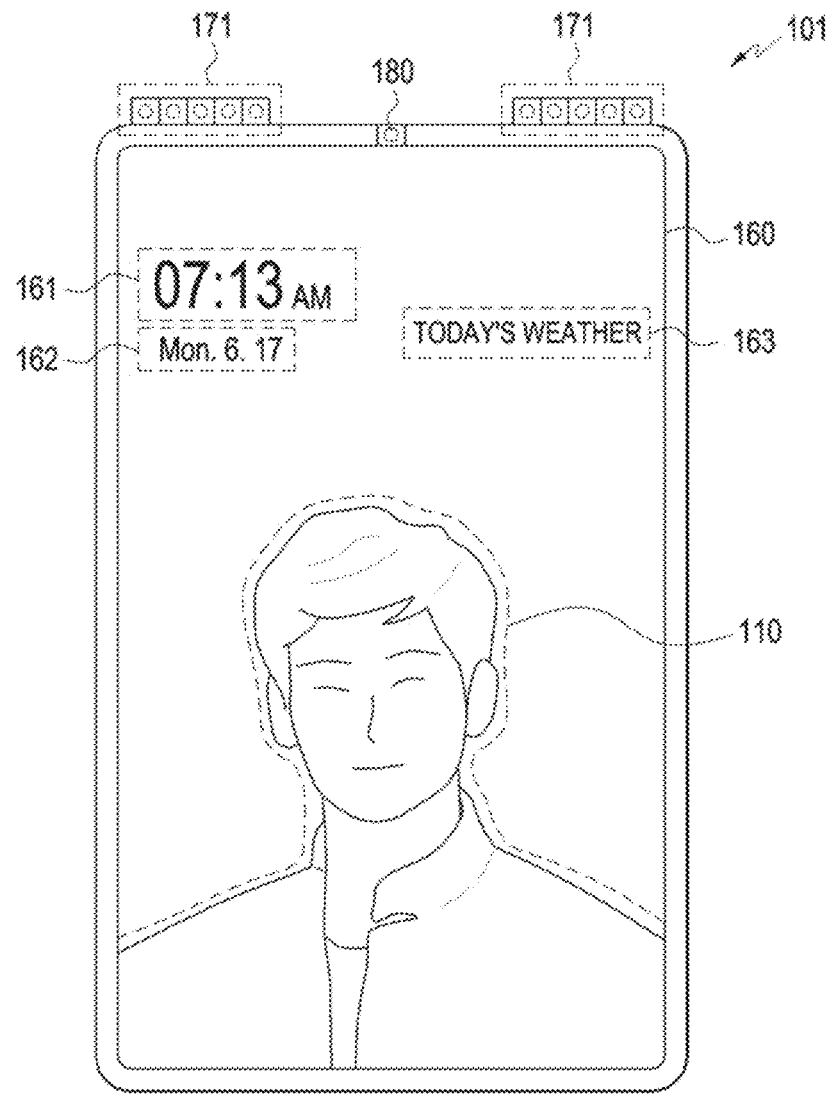
FIG. 1B shows the electronic device in use according to an embodiment.

FIGS. 1A and 1B are show an example electronic device 101 according to an embodiment.

Referring to FIG. 1A, according to an embodiment, an electronic device 101 may include a processor 120, a memory 130, a display 160, a light source 171, a distance sensor 176, and an image sensor 180. In some embodiments, some of the components may be implemented as single integrated circuitry. For example, the distance sensor 176 (e.g., a time-of-flight (ToF) sensor) may be implemented to be embedded in the display 160. According to an embodiment, at least some of the components of FIG. 1 may be implemented to be excluded from the electronic device 101.

According to an embodiment, the processor 120 may execute, for example, software (e.g., a program) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the distance sensor 176) in the memory 130, process the command or the data stored in the memory 130, and store resulting data in the memory 130. According to an embodiment, the processor 120 may include a main processor (e.g., a central processing unit (CPU) or an application processor (AP)), and an auxiliary processor (e.g., a graphics processing unit (GPU), an image signal processor (ISP), a sensor hub processor, or a communication processor (CP)) that is operable independently from, or in conjunction with, the main processor. Additionally or alternatively, the auxiliary processor may be adapted to consume less power than the main processor, or to be specific to a specified function. According to an embodiment, the auxiliary processor may be implemented as separate from, or as part of the main processor. The auxiliary processor may control at least some of functions or states related to at least one component (e.g., the display 160 or the distance sensor 176) of the electronic device 101, instead of the main processor while the main processor is in an inactive (e.g., sleep) state or along with the main processor while the main processor is an active state (e.g., executing an application). According to an embodiment, the auxiliary processor (e.g., an image signal processor) may be implemented as part of another component (e.g., the camera 180) functionally related thereto.

According to an embodiment, the processor 120 may obtain distance sensing data from the distance sensor 176 (e.g., a ToF sensor) (②-1 of FIG. 1). According to an embodiment, the distance sensing data may include information about the distance between the user's face and the electronic device 101 (e.g., the distance sensor 176 or the camera 180) (e.g., the distance between the electronic device 101 and any portion of the user's face). According to an embodiment, the distance sensor 176 may include at least one light source module for outputting a specific signal (e.g., light) and at least one light receiving module for receiving the signal reflected by each of one or more portions of an external object (e.g., face). According to an embodiment, the light source module may output an optical signal to the external object. According to an embodiment, the light source module may modulate the optical signal to have a predetermined frequency and output the resultant optical signal. According to an embodiment, the light source module may include, e.g., a light emitting diode (LED) or a laser diode (LD). According to an embodiment, the light receiving module may receive the optical signal reflected back by the external object. According to an embodiment, the light receiving module may include a photoelectronic device. According to an embodiment, a phase difference may occur between the optical signal output from the light source module and the optical signal obtained by the light receiving module. According to an embodiment, the electronic device 101 (e.g., the processor 120 or the distance sensor 176) may identify the time (e.g., time of flight) taken for the optical signal output from the light source module to be reflected by the external object and obtained by the light receiving module, from the caused phase difference. According to an embodiment, the electronic device 101 (e.g., the processor 120 or the distance sensor 176) may calculate the distance between the external object and the electronic device 101 using the speed of the optical signal and the consumed time. According to an embodiment, the distance sensor 176 may include a sensing circuit using ultrasonic waves, as a replacement or alternative to the distance measuring sensor using light.

According to an embodiment, the processor 120 may obtain a two-dimensional (2D) face image from the camera 180 (②-2 of FIG. 1). According to an embodiment, information about the 2D face image may be transmitted to the processor 120 via a specific interface (e.g., a high-speed serial interface such as a mobile industry processor interface (MIPI or other interfaces). According to an embodiment, the 2D face image may mean an image including the user's face and is not limited to a specific format of image. According to an embodiment, the electronic device 101 may detect a facial area based on the features of the face. According to an embodiment, the electronic device 101 may detect the facial area using various face detection algorithms, such as principal component analysis (PCA) using the eigenface, linear discriminate analysis (LDA), elastic bunch graph matching (EBGM), hidden Markov model, multilinear subspace learning and neuronal motivated dynamic link matching using tensor representation.

According to an embodiment, the electronic device 101 may identify the distance between the user's face and the electronic device 101 (e.g., the camera 180) (④-1 of FIG. 1). According to an embodiment, the electronic device 101 may identify the distance between the user's face and the electronic device 101 (e.g., the camera 180) using distance data measured by the distance sensor 176. According to an embodiment, when the distance sensor 176 includes a ToF sensor, the electronic device 101 may determine that any one with the shortest distance among a plurality of pieces of distance data measured by the distance sensor 176 is the distance from the user's face. According to an embodiment, when the camera 180 includes a plurality of cameras (e.g., in the case of a stereo camera), the electronic device 101 may calculate the distance between the electronic device 101 and the user's face (e.g., any portion of the user's face) by trigonometry and determine that the result of the calculation is the distance between the user's face and the electronic device 101.

According to an embodiment, the electronic device 101 may identify the angle of turn of the face (or, rotation angle of the face) using the obtained 2D face image. According to an embodiment, the electronic device 101 may identify the angle of turn of the user's face by comparing the lines connecting the feature point corresponding to the nose tip (e.g., the middle point of the connecting the centers of the nostrils) and the feature points corresponding to the inner corners of the eyes (in the disclosure, the lines are referred to as "feature point connection lines" for ease of description). For example, according to an embodiment, the electronic device 101 may identify the angle of turn of the user's face using an example table based on the difference in length between the left feature point connection line and the right feature point connection line as shown in Table 1 below. For example, when the identified difference in length between the feature point connection lines is +10 mm, the electronic device 101 may identify that the user's face has been turned about 10 degrees to the right side as compared with when the user's face faces straight ahead (e.g., the left part of the user's face with respect to the nose is positioned closer to the electronic device 101).

TABLE 1

| difference (mm) in length between feature point connection lines (left feature point connection line − right feature point connection line) | face turn angle (°) |
|---|---|
| −90 | −90(90 degrees to the left) |
| 0 | 0 |
| +1 | +1(1 degree to the right) |
| +2 | +2(2 degrees to the right) |
| +3 | +3(3 degrees to the right) |
| +4 | +4(4 degrees to the right) |
| +5 | +5(5 degrees to the right) |
| . . . | . . . |
| +10 | +10(10 degrees to the right) |
| +11 | +11(11 degrees to the right) |
| +12 | +12(12 degrees to the right) |
| +13 | +13(13 degrees to the right) |

Figure 2:
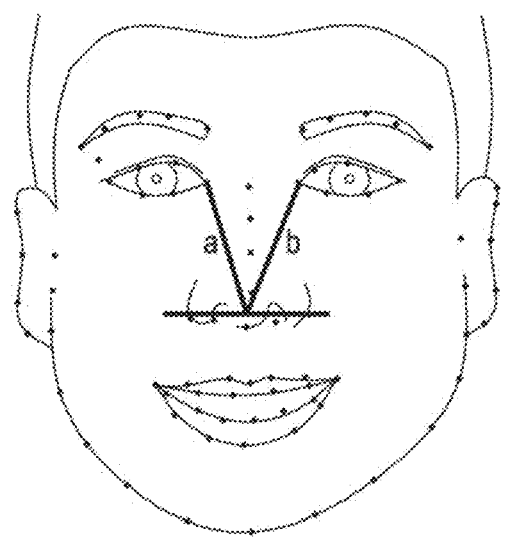
FIG. 2 is a diagram showing feature points and associated connection lines according to an embodiment.

In the disclosure, the phrase "when facing straight ahead" or "state of facing straight ahead" may mean that the difference in length between the identified feature point connection lines falls within a predetermined range (e.g., 3 mm). According to an embodiment, the left feature point connection line may mean a line (e.g., a in FIG. 2) connecting from the nose tip to the inner corner of the left eye, and the right feature point connection line may mean a line (e.g., b in FIG. 2) connecting from the nose tip to the inner corner of the right eye. FIG. 2 is a view showing an example feature point according to an embodiment. According to an embodiment, the electronic device 101 may identify the length of each of the left feature point connection line and the right feature point connection line. According to an embodiment, to detect the feature point connection lines, the electronic device 101 may perform the operation of identifying a plurality of feature points 201 from an obtained 2D face image as shown in FIG. 2. According to an embodiment, the plurality of feature points 201 each may be a predetermined area of the face. According to an embodiment, the electronic device 101 (e.g., the processor 120) may identify at least one of the position and size of the eyes, ears, nose, and mouth, the position and size of the eyebrows, the degree of darkness of the eyebrows, the position of wrinkles, the inter-eyebrow distance, the position and size of the chin, the position and size of the upper chins, the position and size of the forehead, the contour and size of the face, the position of the hair, the position and size of a scar using the plurality of feature points. According to an embodiment, the electronic device 101 may detect the nostrils via an algorithm, e.g., Hough transform.

According to an embodiment, the electronic device 101 may identify the direction in which the face has turned, based on the difference in length between the feature point connection lines. For example, according to an embodiment, when the length of the left feature point connection line is larger than the length of the right feature point connection line, the electronic device 101 may identify that the left part of the user's face with respect to the user's nose has turned to become closer to the electronic device 101. In contrast, according to an embodiment, when the length of the left feature point connection line is smaller than the length of the right feature point connection line, the electronic device 101 may identify that the right part of the user's face with respect to the user's nose has turned to become closer to the electronic device 101.

According to an embodiment, when the distance sensor 176 includes a ToF sensor, the electronic device 101 may identify the angle at which the user's face has turned, using depth information obtained by the ToF sensor.

Figure 3:
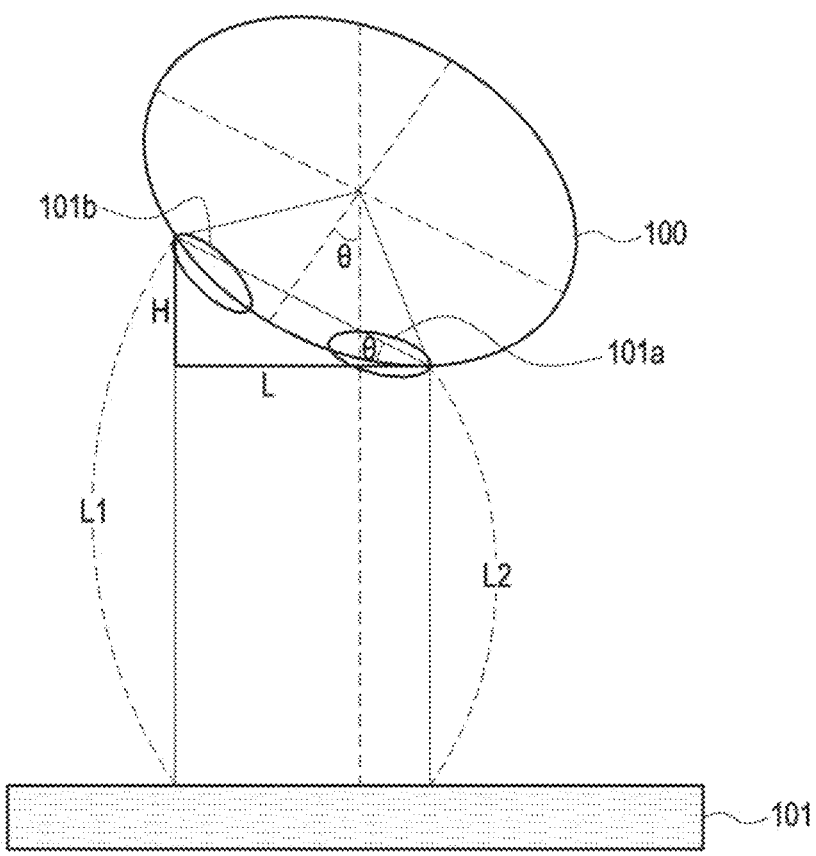
FIG. 3 is a diagram for determining an angle at which a user's face has turned, using a ToF sensor according to an embodiment.

FIG. 3 is a diagram showing how an angle at which a user's face has turned is determined, using a ToF sensor according to an embodiment.

Referring to FIG. 3, according to an embodiment, the electronic device 101 may identify the distances L1 and L2 between the electronic device 101 and the respective ends of the user's right eye 101*a* and left eye 101*b*. According to an embodiment, the electronic device 101 may identify the distance between the electronic device 101 and a specific portion of the user's face by matching the distance data (e.g., depth information) obtained via the ToF sensor and the 2D face image. For example, according to an embodiment, the electronic device 101 may obtain the contour (e.g., the periphery of the face) of the user's face using the distance between the electronic device 101 and the user's face, as measured using the ToF sensor. According to an embodiment, the electronic device 101 may match the contour of the user's face, obtained using the ToF sensor, and the 2D face image. According to an embodiment, in the matched image, the user's 2D face image may be matched to the depth information corresponding to each portion of the face. According to an embodiment, the electronic device 101 may identify the distance between the electronic device 101 and a specific portion of the user's face using the matched image. According to an embodiment, the electronic device 101 may calculate the absolute value H of the difference between the distance L1 between the right eye and the electronic device 101 and the distance L2 between the left eye and the electronic device 101. According to an embodiment, the electronic device 101 may calculate the distance L between the respective ends of the eyes on the plane using the 2D image of the user's face. According to an embodiment, since the electronic device 101 may be aware of H and L, the angle θ at which the user's face has turned may be calculated via an arc tangent operation as expressed in Equation 1 below.

$$\theta = \arctan(H/L) \quad \text{[Equation 1]}$$

According to an embodiment, the electronic device 101 may identify pores and/or wrinkles from the image obtained from the camera 180 (⑤ of FIG. 1). According to an embodiment, the electronic device 101 may identify the pores and/or wrinkles using various algorithms for identifying pores and/or wrinkles. For example, according to an embodiment, the processor 120 may transform the domain of the user's skin image into a domain where brightness may be detected and detect the brightness component from the transformed domain. According to an embodiment, the processor 120 may detect an initial pore area using the detected brightness component and exclude other areas, e.g., spots, than pores, from the initial pore area, thereby detecting the final pore area.

According to an embodiment, the processor 120 may correct a portion (e.g., pores and/or wrinkles) of the user's face in the 2D face image using the 2D face image and distance sensing data (⑥ of FIG. 1).

Figure 4A:
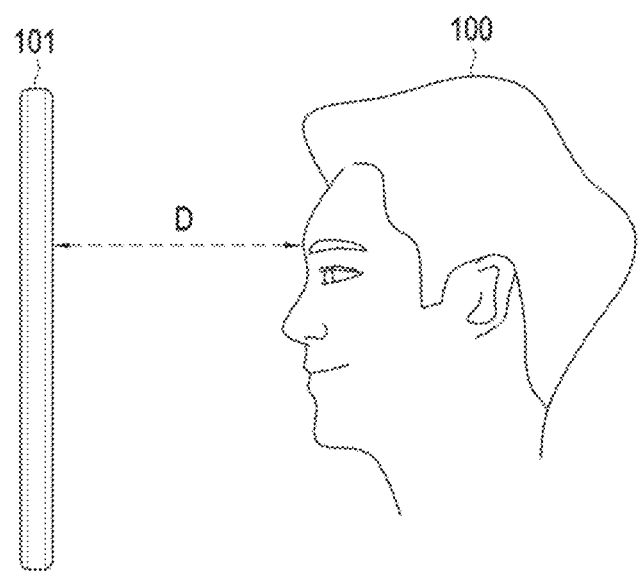
FIG. 4A is a diagram showing a user interacting with the electronic device at a proper distance according to an embodiment.
Figure 4B:
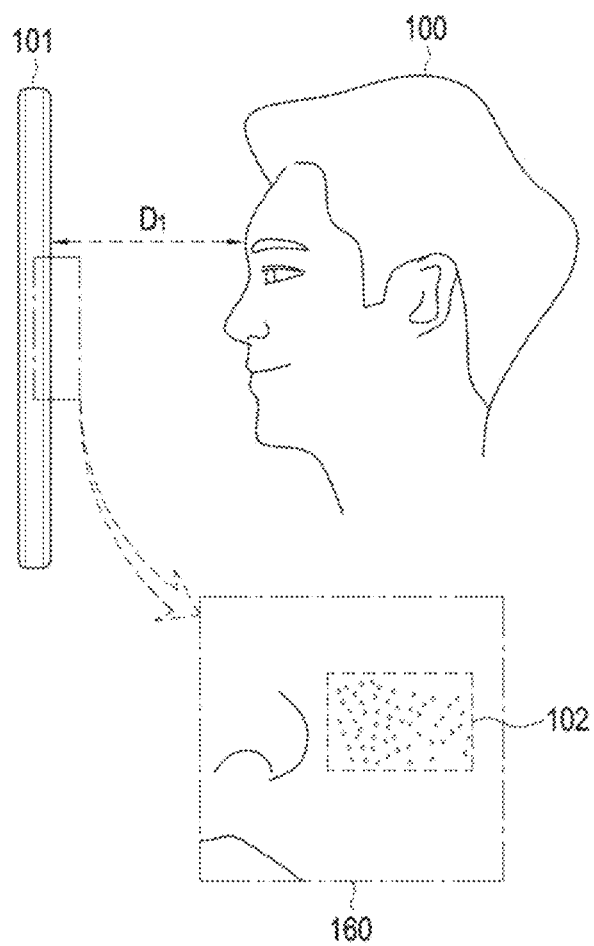
FIG. 4B is a diagram showing a user interacting with the electronic device at too close of a distance according to an embodiment.
Figure 4C:
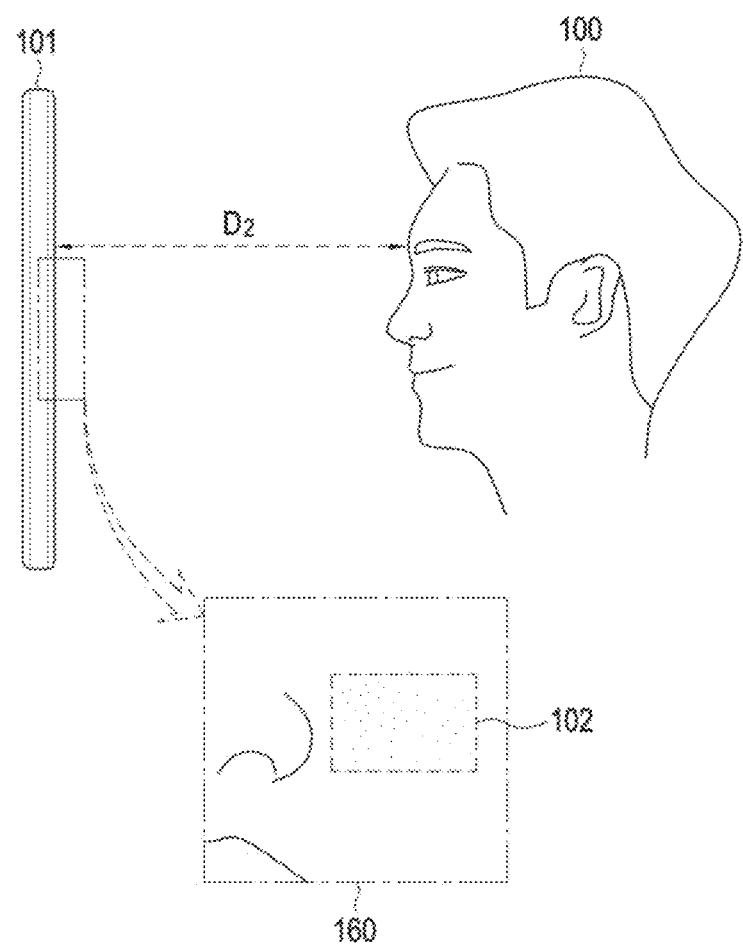
FIG. 4C is a diagram showing a user interacting with the electronic device at too far of a distance according to an embodiment.

FIGS. 4A, 4B, and 4C are views showing an example in which a portion (e.g., pore and/or wrinkle) of a user's face is captured in different sizes depending on distances between an electronic device 101 and the face of the user 100. The pores and wrinkles in the user's face may be captured in various sizes depending on the distances between the electronic device 101 and the user's face. Referring to FIG. 4A, when the distance between the electronic device 101 and the face of the user 100 is an appropriate distance D (e.g., 45 cm), the pores in the user's face may be captured in a size suitable for skin analysis. However, referring to FIG. 4B, when the distance between the user's face and the electronic device 101 is a smaller distance D1 (e.g., 20 cm), the pores 102 may be captured in a size larger than the real size. Referring to FIG. 4C, when the distance between the user's face and the electronic device 101 is a larger distance D2 (e.g., 60 cm), the pores 102 may be captured in a size smaller than the real size. According to an embodiment, the electronic device 101 may correct the size of the pores using Table 2 and Equation 2 below. In Table 2, the distance between the electronic device 101 and the user's face may be the average of the distances between the electronic device 101 and a plurality of arbitrary points in a virtual face. In Table 2 below, the distance between the user's face and the electronic device 101 may be the distance between the electronic device 101 and any portion (e.g., the nose tip or forehead) of the user's face. In Table 2 below, the distance between the user's face and the electronic device 101 may be previously determined at the time of manufacturing the electronic device 101 and be stored in the memory 130.

TABLE 2

| distance (cm) between electronic device and user's face | correction coefficient (K) |
| --- | --- |
| 37 | 0.92 |
| 38 | 0.93 |
| 39 | 0.94 |
| ... | ... |
| 45 | 1 |
| 46 | 1.01 |
| 47 | 1.02 |

$$D' = KD \quad \text{[Equation 2]}$$

In Equation 2, D' may represent the diameter of the corrected pore, K may represent the correction coefficient mentioned as an example in Table 2, and D may represent the diameter of the captured pore. According to an embodiment, in the case where the distance between the electronic device 101 and the user's face is smaller than 45 cm, the correction coefficient may be reduced at a predetermined rate and, when the user's face is larger than 45 cm, the correction coefficient may be increased at a predetermined rate. For example, 45 cm may be a distance at which the pores in the captured image are identified to have the most appropriate size for analysis, which may be a mere example value. The correction coefficient is a coefficient experimentally identified based on the degree at which the size of the object in the image is varied as the capturing distance becomes larger or smaller than the reference distance of 45 cm and this is also a mere example value.

Figure 5A:
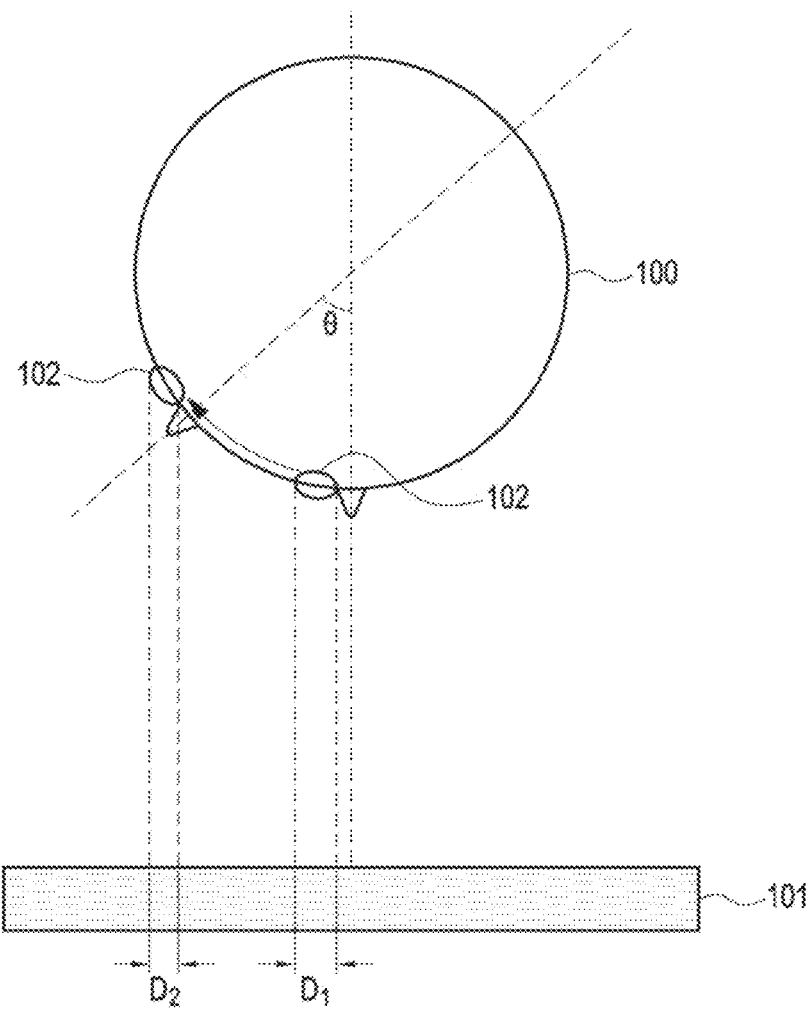
FIG. 5A is a diagram showing that correction (or, modification) is needed to a portion of a user's face when the user's face is turned at a predetermined angle with respect to the electronic device according to an embodiment.

FIG. 5A is a diagram showing a scenario in which a portion of a user's face needs to be corrected by turning the user's face at a predetermined angle. The user's face may face straight ahead to the electronic device 101 or, as shown in FIG. 5A, the user's face may face a predetermined angle away from the electronic device 101. According to an embodiment, in the case where the face has turned a specific angle away from the electronic device 101, the pores may be captured in a length smaller than the actual diameter (e.g., D1 of FIG. 5A) due to the angle of turn θ of the face. Thus, precise measurement of the skin condition requires correction into the actual pore diameter (or wrinkle length).

According to an embodiment, the electronic device 101 may correct the size of the pores using Equation 3 below.

$$D'=D \cos \theta \quad \text{[Equation 3]}$$

In Equation 3, D' may represent the corrected pore diameter, D may represent the diameter of the captured pore, cos may represent the cosine operation, and θ may represent the angle of turn of face. Likewise, according to an embodiment, the electronic device 101 may replace the "pore diameter" with "wrinkle length" in Equation 3 and correct the length of wrinkles captured with the face in the turned position into the length of wrinkles captured when it faces straight ahead to the electronic device 101.

Figure 5B:
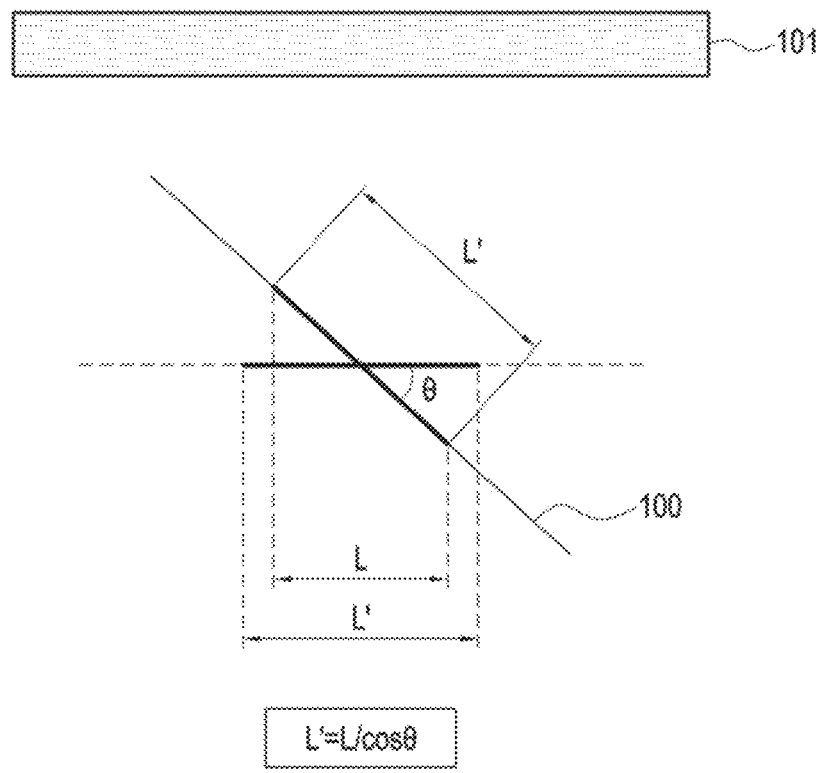
FIG. 5B is a diagram showing how Equation 3 is derived.

FIG. 5B is a diagram showing how Equation 3 is derived. Referring to FIG. 5B, according to an embodiment, when the user 100 is positioned with her face turned at a specific angle θ from the electronic device 101, the user's face may be captured, by the electronic device 101, in length L which is shorter than L' which is the length of wrinkles when the user looks straight ahead. In this case, the length L' of wrinkles when the user looks straight ahead may be calculated by multiplying the length L of wrinkles captured by the reciprocal of cos θ.

According to an embodiment, the diameter of pores (or length of wrinkles) may be corrected using Equation 4 below.

$$D'=(K/\cos \theta)D \quad \text{[Equation 4]}$$

In Equation 4, D' may represent the diameter of the corrected pore, K may represent the correction coefficient mentioned as an example in Table 2, D may represent the diameter of the captured pore, and cos may represent the cosine operation.

According to an embodiment, the memory 130 may store various data used by at least one component (e.g., the processor 120 or the distance sensor 176) of the electronic device 101. The various data may include, for example, software (e.g., the program) and input data or output data for a command related thereto. According to an embodiment, the memory 130 may include a volatile or non-volatile memory. The program may be stored, as software, in the memory and may include, e.g., an operating system (OS), middleware, or an application. According to an embodiment, the memory 130 may store the distance sensing data and data for the 2D face image (③ of FIG. 1). According to an embodiment, the distance sensing data and data for 2D face image may be transmitted from the distance sensor 176 and the camera 180, respectively, to the memory 130 directly (e.g., without passing through the processor 120). In this case, according to an embodiment, the distance sensing data and data for 2D face image may be provided from the memory 130 to the processor 120.

According to an embodiment, the display 160 may visually provide information to the outside (e.g., the user) of the electronic device 101. According to an embodiment, the display 160 may include, for example, a display, a hologram device, or a projector and control circuitry to control a corresponding one of the display, hologram device, and projector. According to an embodiment, the display 160 may include touch circuitry adapted to detect a touch, or sensor circuitry (e.g., a pressure sensor) adapted to measure the intensity of force incurred by the touch. According to an embodiment, the display 160 may obtain information regarding the corrected pores and/or wrinkles from the processor 120 (⑦ of FIG. 1). According to an embodiment, a display control signal may enable the display 160 to output information (information indicating that the wrinkles and pores have been corrected in the same size as is measured when the face faces straight ahead or information about various skin care solutions determined based on the size of pores and wrinkles corrected in the same size as is measured when the face faces straight ahead) about a portion (e.g., pores and/or wrinkles) of the corrected face. According to an embodiment, the display 160 may output the information about the portion of the face, corrected according to the display control signal obtained from the processor 120.

According to an embodiment, the light source 171 may include at least one light emitting diode (LED). According to an embodiment, the light source may mean a single LED or a circuit including an array of a plurality of LEDs. According to an embodiment, the display 160 may obtain a light source control signal from the processor 120 (① of FIG. 1). According to an embodiment, the light source 171 may control the output of at least part of the light source according to a light source control signal received from the processor 120.

According to an embodiment, the distance sensor 176 may generate data regarding the distance between an external object (e.g., the user's face) and the electronic device 101 using light. According to an embodiment, the distance sensor 176 may include, e.g., a ToF sensor. According to an embodiment, the electronic device 101 may measure the time between the output of a specific signal (e.g., light) and the reception, by the electronic device 101, of the signal reflected by the external object, using the ToF sensor. According to an embodiment, the electronic device 101 (e.g., the processor 120) may identify the distance between the external object and the electronic device 101 using the measured time. According to an embodiment, the distance sensor 176 may transmit the obtained raw data (e.g., distance sensing data) to the processor. According to an embodiment, the distance sensor 176 may generate data about the three-dimensional (3D) shape of the user's face using the obtained raw data and then transmit the generated data about the 3D shape of the user's face to the processor. According to an embodiment, the distance sensor 176 may transmit the obtained raw data and/or the generated data about the 3D shape of the user's face to the memory 130.

According to an embodiment, the camera 180 may capture a still image or motion picture (video). According to an embodiment, the camera 180 may include one or more lenses, image sensors (e.g., charge-coupled devices (CCDs) or complementary metal-oxide-semiconductors (CMOSs)), image signal processors, or flashes. According to an embodiment, the camera 180 may include a stereo camera. According to an embodiment, the stereo camera may capture object images by simultaneously using two or more lenses of the same kind. According to an embodiment, the electronic device 101 (e.g., the processor 120) may obtain a stereoscopic image of the external object using the image captured using each camera of the stereo camera.

Referring to FIG. 1B, according to an embodiment, the electronic device 101 may include a display 160 that displays the user's image 110. According to an embodiment, the electronic device 101 may obtain the user image 110 using the camera 180. According to an embodiment, "user image 110" may mean an image for the user's body portion including the user's facial area. According to an embodiment, the display 160 of the electronic device 101 may display time information 161, date information 162, and weather information 163. According to an embodiment, a single light source 171 may be disposed on the top, bottom, or side of the electronic device 101, or two light sources 171 may be symmetrically or asymmetrically disposed on the top, bottom, or side of the electronic device 101.

Figure 5C:
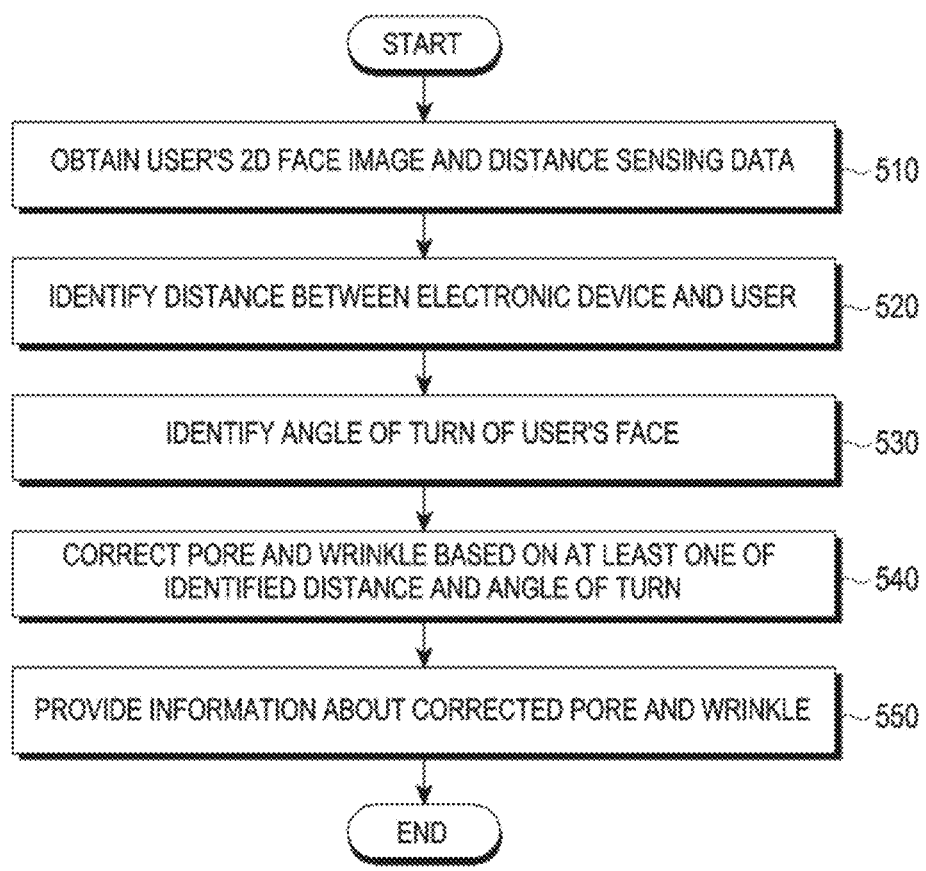
FIG. 5C is a flowchart of a method for operating an electronic device according to an embodiment.

FIG. 5C is a flowchart of a method for operating an electronic device 101 according to an embodiment.

According to an embodiment, the electronic device 101 (e.g., the processor 120 of FIG. 1) may obtain the user's 2D face image and distance sensing data in operation 510. According to an embodiment, the electronic device 101 (e.g., the display 160) may output a guide for obtaining the user's 2D face image. According to an embodiment, when it is identified that the user's face is positioned in the area of the guide, the electronic device 101 (e.g., the processor 120 of FIG. 1) may output a signal for obtaining the user's face image to the distance sensor 176 and the camera 180. According to an embodiment, as receiving the control signals from the processor 120, the distance sensor 176 and the camera 180 may output a signal for obtaining the user's face image to the outside of the electronic device 101. According to an embodiment, the electronic device 101 may obtain information about the distance between the user and the electronic device 101 using the distance sensor 176 (e.g., a ToF sensor). According to an embodiment, the electronic device 101 may obtain the user's 2D face image using the camera 180. According to an embodiment, the distance sensor 176 (e.g., a ToF sensor) and the camera 180 may transmit the sensing data and data for the 2D face image to the processor 120. According to an embodiment, the distance sensing data may include depth information about the user's face. According to an embodiment, the 2D face image may not include the depth information about the user's face. According to an embodiment, the distance sensing data may be obtained by the distance sensor 176 (e.g., a ToF sensor) and be transmitted to the processor 120. According to an embodiment, the data for the 2D face image may be obtained by the camera 180 and be transmitted to the processor 120.

According to an embodiment, the electronic device 101 (e.g., the processor 120 of FIG. 1) may identify the distance between the user and the electronic device 101 (e.g., the camera 180) in operation 520. According to an embodiment, the electronic device 101 may identify the distance between the user's face and the electronic device 101 (e.g., the camera 180) using distance data measured by the distance sensor 176. According to an embodiment, when the distance sensor 176 includes a ToF sensor, the electronic device 101 may determine that any one with the shortest distance among a plurality of pieces of distance data measured by the distance sensor 176 is the distance from the user's face. According to an embodiment, when the camera 180 includes a plurality of cameras (e.g., in the case of a stereo camera), the electronic device 101 may calculate the distance between the electronic device 101 and the user's face (e.g., any portion of the user's face) by trigonometry and determine that the result of the calculation is the distance between the user's face and the electronic device 101.

According to an embodiment, the electronic device 101 (e.g., the processor 120 of FIG. 1) may identify the angle of turn of the user's face in operation 530. According to an embodiment, the electronic device 101 may identify the angle at which the user's face has turned, using the depth information obtained by the ToF sensor and the difference in length between the feature point connection lines.

According to an embodiment, the electronic device 101 may correct the pores and wrinkles based on at least one of the identified distance and angle of turn in operation 540. According to an embodiment, the electronic device 101 may correct the pores and/or wrinkles using Equations 2, 3, and/or 4.

According to an embodiment, the electronic device 101 may provide information about the corrected pores and wrinkles in operation 550. According to an embodiment, the electronic device 101 may output information indicating that the pores and wrinkles have been corrected in the same size as is measured when the face faces straight ahead to the display 160. According to an embodiment, the electronic device 101 may provide various skin care solutions determined based on the size of the pores and wrinkles corrected in the actual size (e.g., the size when the user looks straight at the electronic device 101). According to an embodiment, the electronic device 101 may provide information about the position, size, and/or shape of the corrected pores and information about the position, size, and/or shape of the corrected wrinkles.

Figure 6A:
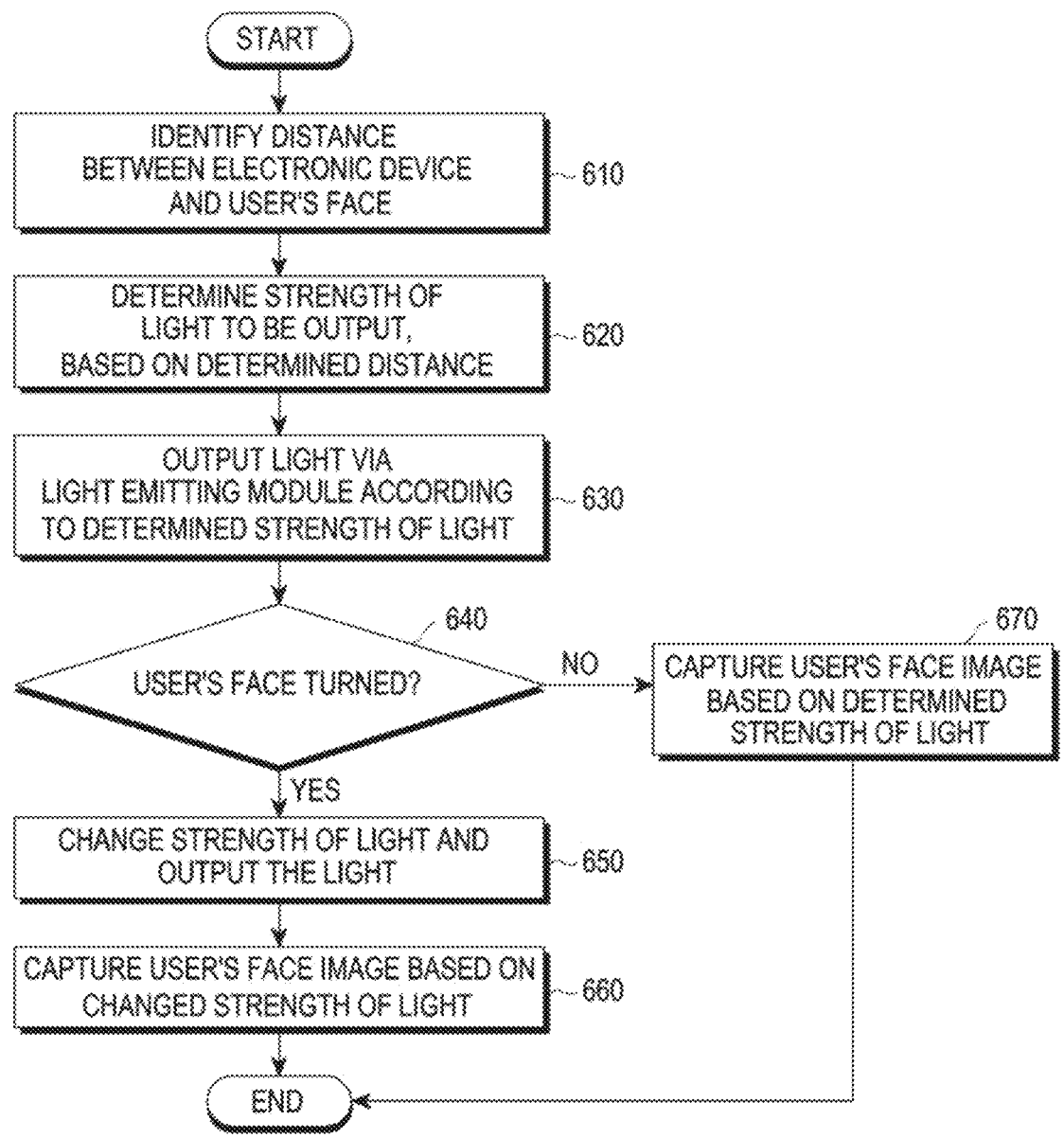
FIG. 6A is a flowchart of a method of controlling an output of a light emitting module depending on whether a user's face turns according to an embodiment.
Figure 6B:
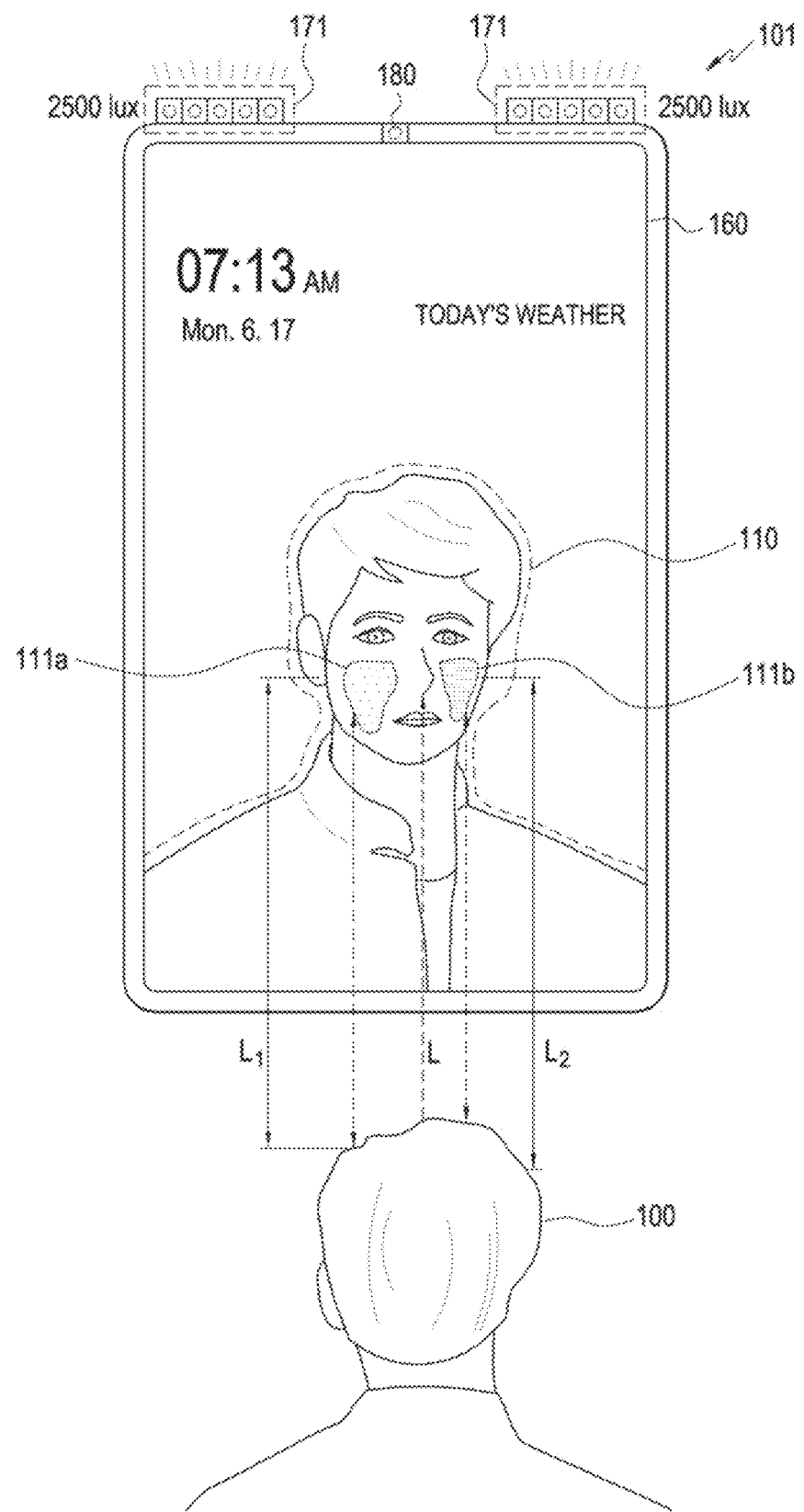
FIG. 6B shows the electronic device controlling the light sources at an even strength according to an embodiment.
Figure 6C:
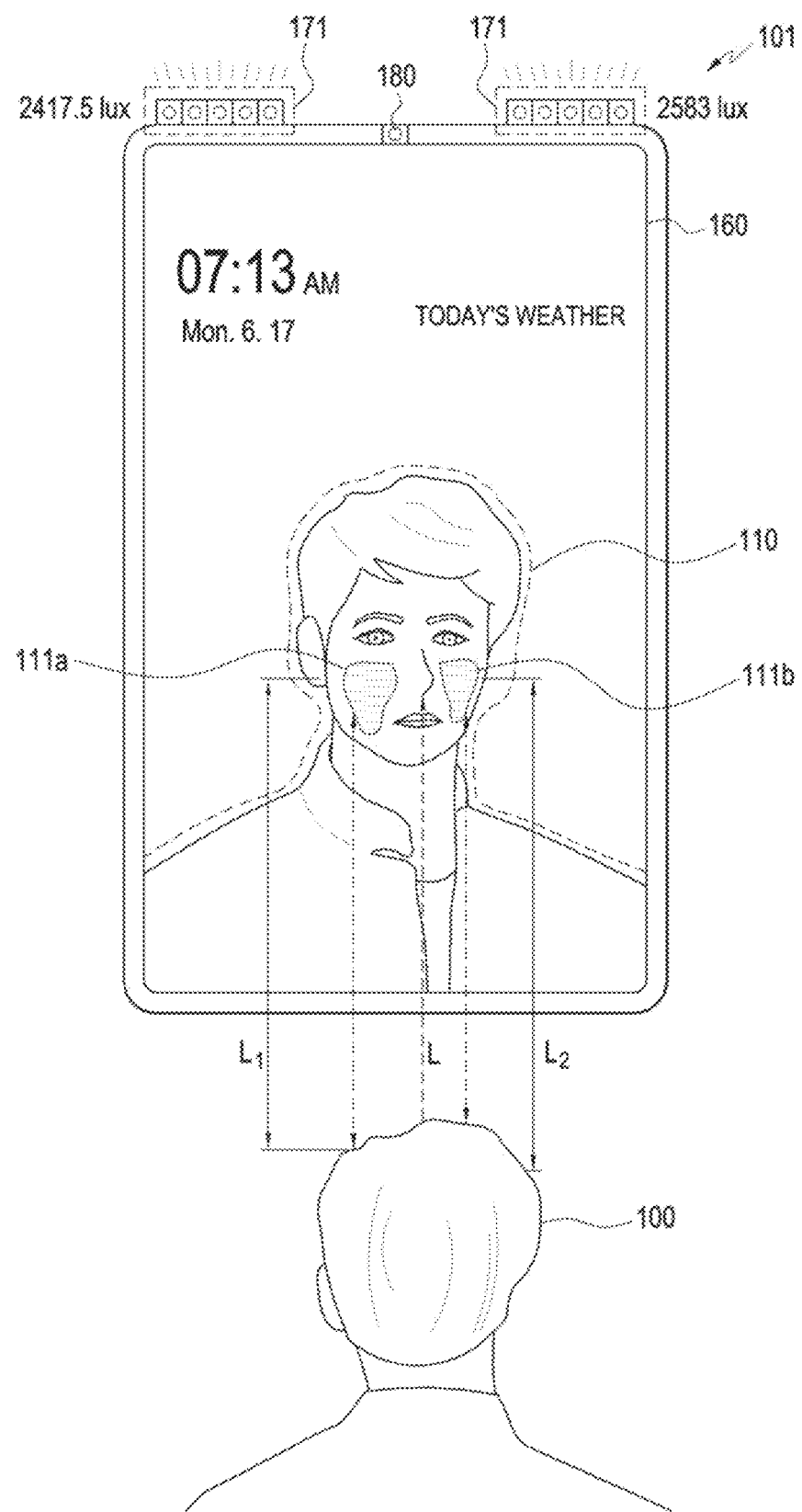
FIG. 6C shows the electronic device controlling the light sources at different strengths according to an embodiment.

FIGS. 6A, 6B, and 6C show the operation of controlling an output of a light source 171 depending on whether a user's face turns.

FIG. 6A is a flowchart of a method of controlling an output of a light source 171 depending on whether a user's face turns. Referring to FIG. 6A, according to an embodiment, the electronic device 101 (e.g., the processor 120) may identify the distance between the electronic device 101 and the user in operation 610. The description of the method for identifying the distance between the user and the electronic device in connection with FIG. 1A may apply to operation 610.

According to an embodiment, in operation 620, the electronic device 101 (e.g., the processor 120) may determine the strength of light to be output by the light source 171, based on the identified distance. According to an embodiment, the electronic device 101 may determine the strength of light to be output, using, e.g., Table 3 below.

TABLE 3

| distance (cm) between electronic device 101 and user's face | strength (lux) of light to be output |
|---|---|
| . . . | . . . |
| 40 | 2000 |
| 41 | 2100 |

TABLE 3-continued

| distance (cm) between electronic device 101 and user's face | strength (lux) of light to be output |
|---|---|
| 42 | 2200 |
| 43 | 2300 |
| 44 | 2400 |
| 45 | 2500 |
| 46 | 2600 |
| ... | ... |

According to an embodiment, the electronic device 101 (e.g., the processor 120) may output the light via the light source 171 according to the determined strength of light, in operation 630.

According to an embodiment, the electronic device 101 (e.g., the processor 120) may determine whether the user's face has been turned in operation 640. The description of the method for identifying whether the user's face has turned in connection with FIG. 1A may apply to operation 640.

According to an embodiment, when the user's face has turned (yes in operation 640), the electronic device 101 (e.g., the processor 120) may change the strength of light output and output the light. According to an embodiment, the electronic device 101 may decrease the strength of light for the light source 171 corresponding to the portion which has been positioned closer to the electronic device as the user's face turns. According to an embodiment, the electronic device 101 may increase the strength of light for the light source 171 corresponding to the portion which has been positioned farther from the electronic device as the user's face turns. According to an embodiment, the electronic device 101 may control the strength of the light output, using, e.g., Table 4 below.

TABLE 4

| difference (mm) in length between left (left feature point connection line − right feature point connection line) and right feature point connection lines | increase/decrease ratio |
|---|---|
| ... | ... |
| −3(turned to the left) | left light source: 10% increase right light source: 10% decrease |
| −2(turned to the left) | left light source: 6.7% increase right light source: 6.7% decrease |
| −1(turned to the left) | left light source: 3.3% increase right light source: 3.3% decrease |
| 0(facing straight ahead) | — |
| +1(turned to the right) | left light source: 3.3% decrease right light source: 3.3% increase |
| +2(turned to the right) | left light source: 6.7% decrease right light source: 6.7% increase |
| +3(turned to the right) | left light source: 10% decrease right light source: 10% increase |
| +4(turned to the right) | left light source: 13.3% decrease right light source: 13.3% increase |
| +5(turned to the right) | left light source: 16.7% decrease right light source: 16.7% increase |
| ... | ... |

According to an embodiment, in operation 660, the electronic device 101 (e.g., the processor 120) may capture the user's face image based on the changed light strength. According to an embodiment, when the user's face faces straight ahead (no in operation 640), the electronic device 101 (e.g., the processor 120) may capture the user's face image based on the strength of light determined according to operation 630, in operation 670.

Referring to FIG. 6B, when the output of the light source 171 is controlled at the same output strength (e.g., 2500 lux), the portion (e.g., the left cheek 111a with respect to the nose) which is brought closer to the electronic device 101 as the face of the user 100 turns, may be captured brighter than when facing straight ahead, and the portion (e.g., the right cheek 111b with respect to the nose) which is brought farther from the nose may be captured darker than when facing straight ahead. For example, length L1 may be larger than length L2. In FIG. 6B, L may represent the distance between the electronic device 101 and the face of the user 100 when the user's face faces straight ahead. Thus, when the face of the user 100 is in a turned position, the strength of the light output from the electronic device 101 may need to be controlled so as to obtain a face image with a uniform brightness.

Referring to FIG. 6C, according to an embodiment, the electronic device 101 may control the strength of the light output from the light source 171 based on the difference in length between the left feature point connection line and the right feature point connection line. For example, when the difference in length between the left feature point connection line and the right feature point connection line is +4 mm (e.g., when the user's face turns right), the strength of the light output from the left light source 171a may be reduced by 13.3%, and the strength of the light output from the right light source 171b may be increased by 13.3%. When the difference in length between the left feature point connection line and the right feature point connection line is −4 mm (e.g., when the user's face turns left), the strength of the light output from the left light source 171a may be increased by 13.3%, and the strength of the light output from the right light source 171b may be decreased by 13.3%. By such operations, although the user's face turns, the left cheek 111a and right cheek 111b of the user's face may remain uniform or even.

FIGS. 7A, 7B, 7C, and 7D show the operation of adaptively controlling the size of a guide for skin analysis depending on the size of a user's face, by an electronic device 101, according to an embodiment.

Figure 7A:
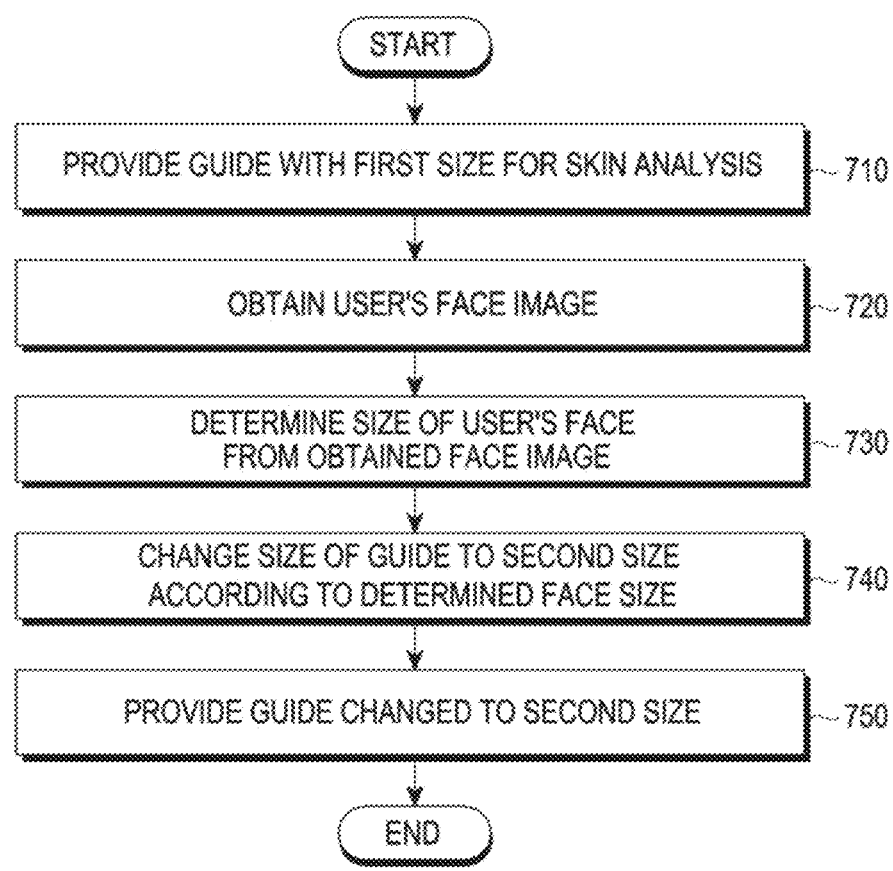
FIG. 7A is a flowchart of a method of adaptively controlling the size of a guide for skin analysis depending on the size of a user's face, by an electronic device, according to an embodiment.

FIG. 7A is a flow chart showing the operation of adaptively controlling the size of a guide for skin analysis depending on the size of a user's face, by an electronic device 101 according to an embodiment. Referring to FIG. 7A, according to an embodiment, the electronic device 101 may provide a guide with a first size for skin analysis, in operation 710. According to an embodiment, the guide may include a user interface for allowing the electronic device 101 to obtain the size of pores and the length of wrinkles for skin analysis which are appropriate for skin analysis. According to an embodiment, the guide may be displayed on the display 160. According to an embodiment, the guide may include a circular or oval user interface that has a size (e.g., diameter) corresponding to the face size when the user who has an average face size is positioned, e.g., 45 cm away from the electronic device 101. As such, according to an embodiment, the guide may be a user interface provided based on the average face size (e.g., length) and may thus fail to reflect the face size of each of users who have various face sizes. For example, when a user who has a face size smaller than the average face size fits his face into the guide provided by the electronic device 101, the user may be positioned at a distance shorter than the appropriate distance (e.g., 45 cm) for skin analysis. In such a case, since the distance between the electronic device 101 and the user's face is shorter than the distance (e.g., 45 cm) appropriate for skin analysis, precise skin analysis may be difficult to achieve. Thus, it may be needed to adaptively control the size of the guide and provide the guide to the user so that the distance between the electronic device 101 and the user's face maintains the appropriate distance (e.g., 45 cm) for skin analysis. For example, in the case where the user's face size is smaller than the average face size and the guide is shrunken at a specific rate, the user may increase the distance from the electronic device 101 to fit her face into the guide. Thus, it is possible to maintain the distance between the electronic device 101 and the user's face as the appropriate distance (e.g., 45 cm) for skin analysis.

According to an embodiment, the electronic device 101 may obtain the user's face image in operation 720. According to an embodiment, the electronic device 101 may display the obtained user face image on the display 160.

According to an embodiment, the electronic device 101 may identify the user's face size (e.g., length) from the obtained user face image in operation 730. According to an embodiment, the electronic device 101 may determine that the length between the end of the chin and the end of the head is the face size. According to an embodiment, the electronic device 101 may determine that the width of the face (e.g., the length between the end of the right cheek and the end of the left cheek) is the face size.

According to an embodiment, in operation 740, the electronic device 101 may change the size of the guide into a second size according to the identified face size. According to an embodiment, operation 740 may be performed when the identified user face size differs from the average face size. To that end, according to an embodiment, the electronic device 101 may further perform the operation of determining whether the user's face size differs from the average face size. Since the average face size differs per gender, the electronic device 101, according to an embodiment, may further perform the operation of receiving the user's gender before controlling the size of the guide. According to an embodiment, the electronic device 101 may control the size of the guide based on Tables 5 and 6 below, depending on the user's gender. Table 5 below may be used when the user is a male, and Table 6 below may be used when the user is a female. According to an embodiment, the electronic device 101 may control the size of the guide in such a manner as to multiply the size (e.g., diameter or horizontal length) of the guide being currently displayed on the electronic device 101 by a correction coefficient determined according to the user's face size. According to an embodiment, by multiplying the size of the guide by a predetermined correction coefficient, the distance between the electronic device 101 and the user may be maintained as the distance appropriate for skin analysis.

TABLE 5

| face size (cm) | correction coefficient (K) |
| --- | --- |
| . . . | . . . |
| 22.0 | 0.97 |
| 22.5 | 0.98 |
| 23.0 | 0.99 |
| 23.5 | 1 |
| 24.0 | 1.01 |
| 24.5 | 1.02 |
| 25.0 | 1.03 |
| 25.5 | 1.04 |
| 26.0 | 1.05 |
| . . . | . . . |

TABLE 6

| face size (cm) | correction coefficient (K) |
| --- | --- |
| . . . | . . . |
| 20.5 | 0.97 |
| 21.0 | 0.98 |
| 21.5 | 0.99 |
| 22.0 | 1 |
| 22.5 | 1.01 |
| 23.0 | 1.02 |
| 23.5 | 1.03 |
| 24.0 | 1.04 |
| 24.5 | 1.05 |
| . . . | . . . |

According to an embodiment, the electronic device 101 may provide the guide, which has been changed the second size, to the user in operation 750. According to an embodiment, the electronic device 101 may display the guide, which has been changed to have the second size, on the display 160.

Figure 7B:
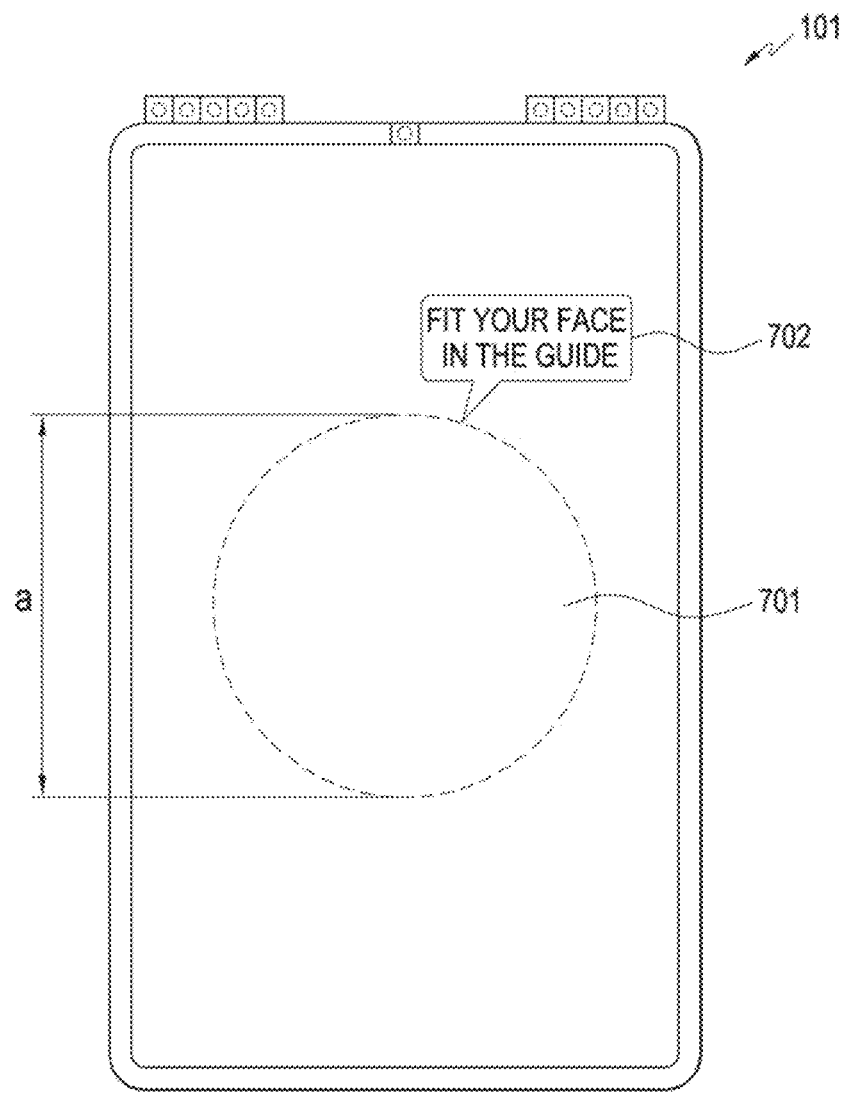
FIG. 7B shows a guide for skin analysis being displayed by the electronic device, according to an embodiment.

Referring to FIG. 7B, according to an embodiment, the electronic device 101 may display a guide 701 on the display 160. According to an embodiment, the electronic device 101 may display a guidance message 702, e.g., "Fit your face in the guide," as well. According to an embodiment, the shape of the guide 701 may be circular, and the diameter of the guide 701 may be "a".

Figure 7C:
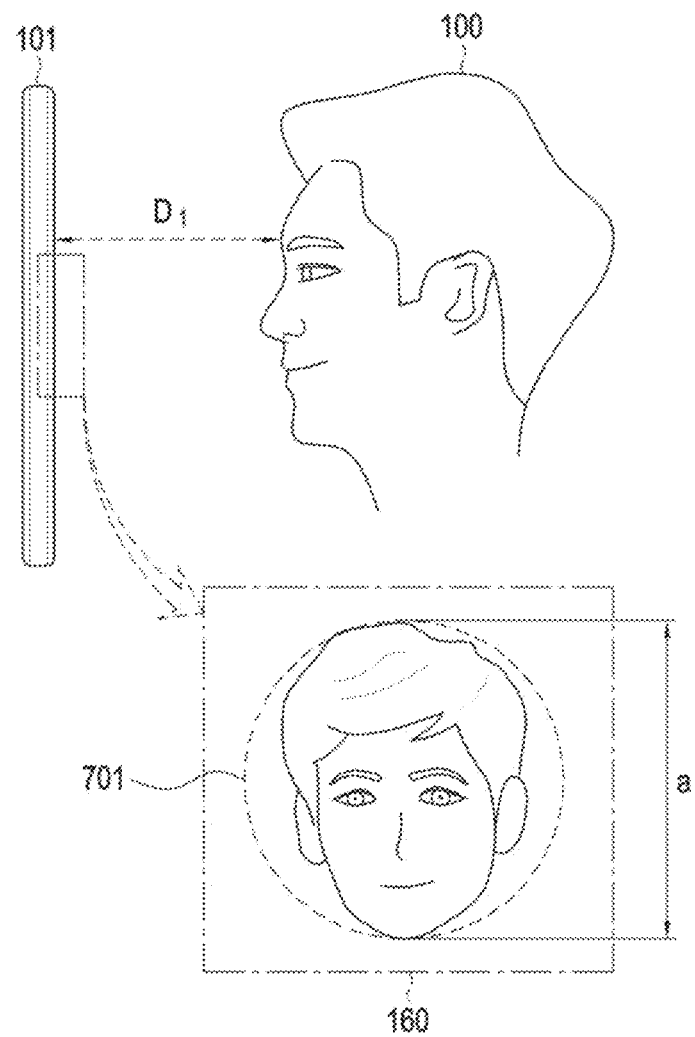
FIG. 7C is a diagram showing a user using the guide displayed by the electronic device, according to an embodiment.

Referring to FIG. 7C, the user 100 whose face size is smaller than the average face size may be needed to approach the electronic device 101 to fit her face in the guide 701. In such a case, the distance between the electronic device 101 and the user 100 may be smaller than the distance (e.g., 45 cm) appropriate for skin analysis. FIG. 7C illustrates an example in which the face of the user 100 is positioned at the distance D1 between the electronic device 101 and the user 100, which is smaller than the distance (e.g., 45 cm) appropriate for skin analysis. According to an embodiment, the face of the user 100, together with the guide 701, may be displayed on the display 160.

Figure 7D:
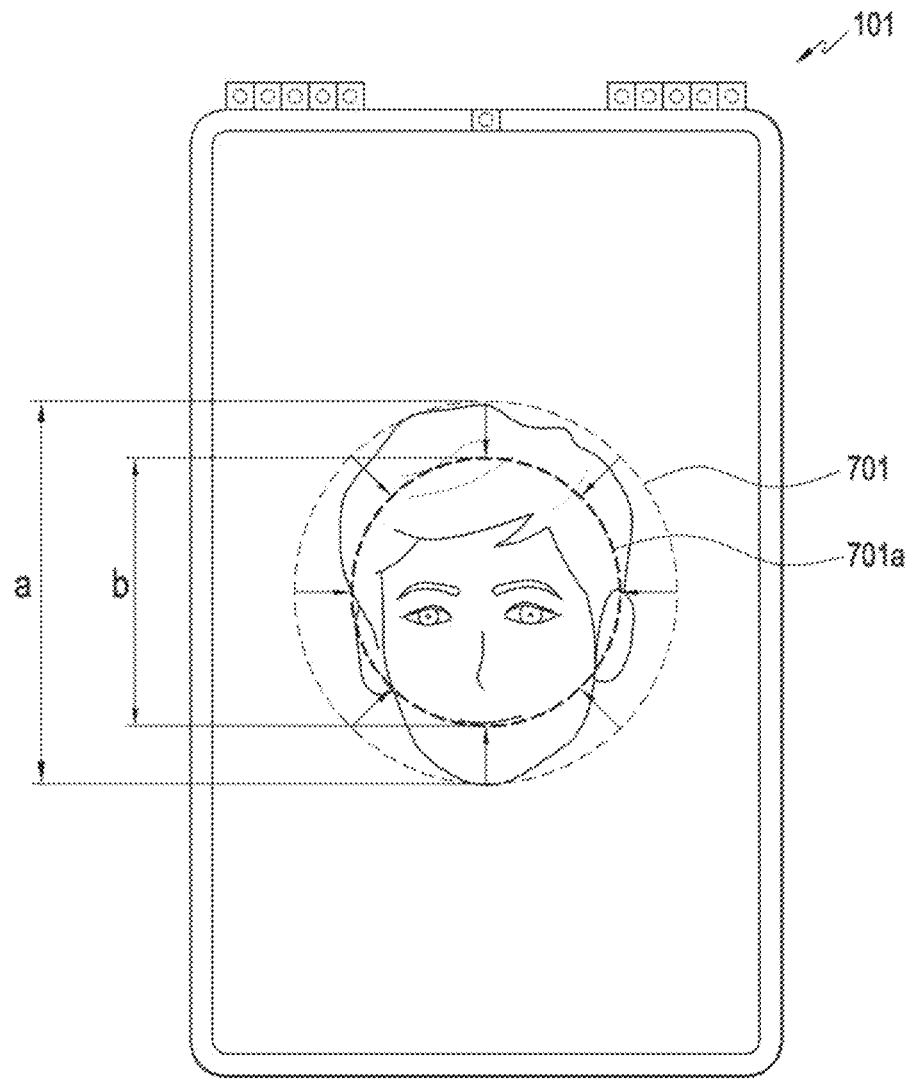
FIG. 7D shows a size of the guide being adjusted to fit a user's face according to an embodiment.

Referring to FIG. 7D, according to an embodiment, the electronic device 101 may determine the diameter "b" of the guide which is shrunken using Table 5 or 6. According to an embodiment, a second guide 701a which has the diameter b of the shrunken guide may be displayed on the display 160.

FIGS. 8A, 8B, 8C, and 8D show the operation of analyzing the skin of an entire face by an electronic device 101 according to an embodiment.

Figure 8A:
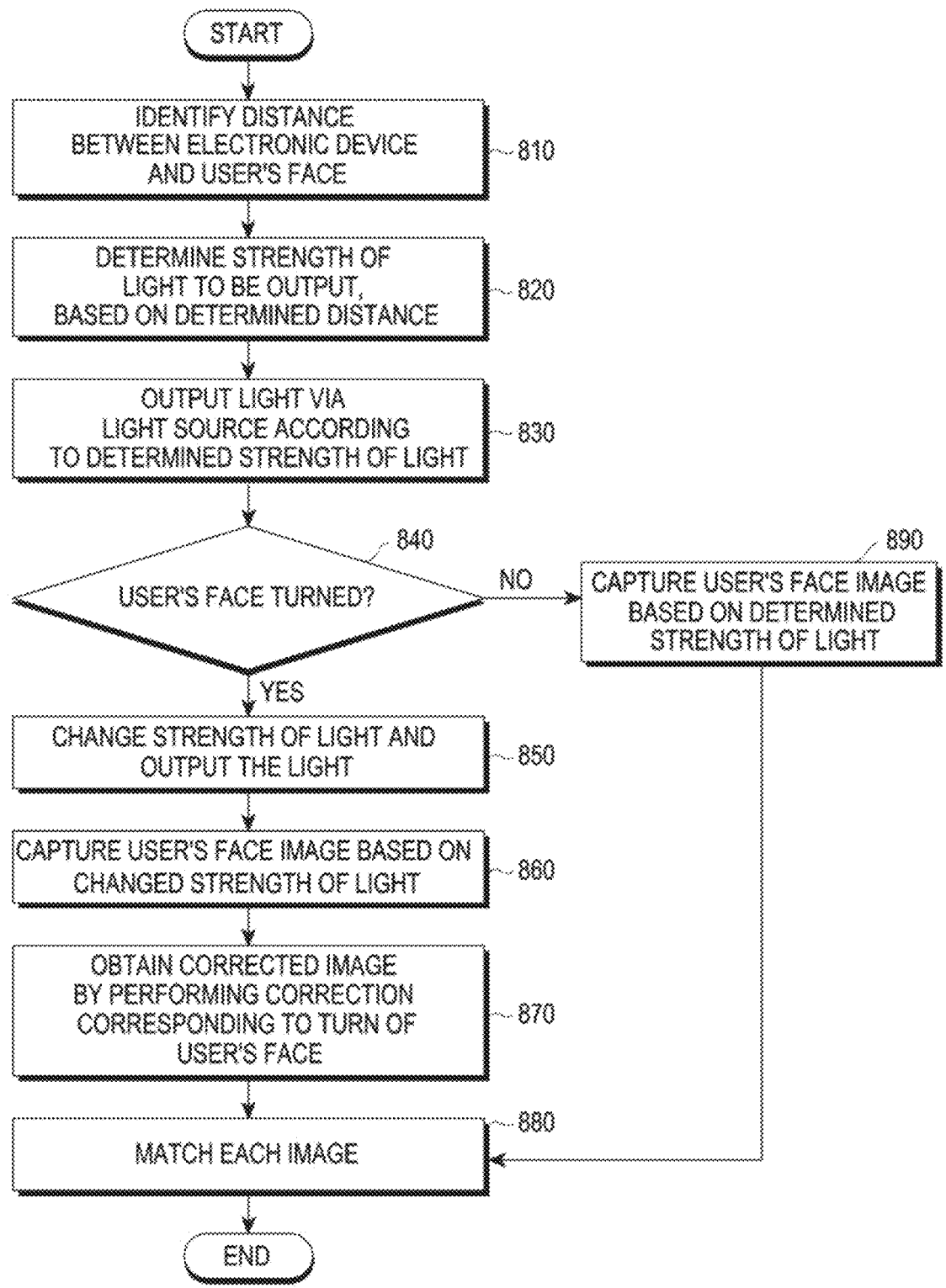
FIG. 8A is a flowchart of a method of analyzing the skin of an entire face by the electronic device according to an embodiment.

FIG. 8A is a flowchart showing the operation of analyzing the skin of an entire face by an electronic device 101 according to an embodiment. Referring to FIG. 8A, according to an embodiment, the electronic device 101 (e.g., the processor 120) may identify the distance between the electronic device 101 and the user in operation 810. The description of the method for identifying the distance between the user and the electronic device in connection with FIG. 1A may apply to operation 610.

According to an embodiment, in operation 820, the electronic device 101 (e.g., the processor 120) may determine the strength of light to be output, based on the identified distance. According to an embodiment, the electronic device 101 may determine the strength of light to be output, using, e.g., Table 3.

According to an embodiment, in operation 830, the electronic device 101 (e.g., the processor 120) may output the light via the light source 171 according to the determined strength of light.

According to an embodiment, the electronic device 101 (e.g., the processor 120) may determine whether the user's face has been turned in operation 840. The description of the method for identifying whether the user's face has turned in connection with FIG. 1A may apply to operation 840.

According to an embodiment, when the user's face has turned (yes in operation 640), the electronic device 101 (e.g., the processor 120) may change the strength of light output and output the light. According to an embodiment, the electronic device 101 may decrease the strength of light for the light source 171 corresponding to the portion which has been positioned closer to the electronic device as the user's face turns. According to an embodiment, the electronic device 101 may increase the strength of light for the light source 171 corresponding to the portion which has been positioned farther from the electronic device as the user's face turns. According to an embodiment, the electronic device 101 may control the strength of the light output, using, e.g., Table 4.

According to an embodiment, in operation 860, the electronic device 101 (e.g., the processor 120) may capture the user's face image based on the changed light strength. According to an embodiment, in operation 890, when the user's face faces straight ahead (no in operation 840), the electronic device 101 (e.g., the processor 120) may capture the user's face image based on the strength of light determined according to operation 830.

According to an embodiment, in operation 870, the electronic device 101 (e.g., the processor 120) may obtain a corrected image by performing correction corresponding to the turn of the user's face. The description of the method for correcting a portion of the user's face in response to the turn of the user's face in connection with FIG. 1A may apply to operation 870.

According to an embodiment, the electronic device 101 (e.g., the processor 120) may match each image in operation 880. For example, according to an embodiment, the electronic device 101 may synthesize the image (e.g., the face image when the face has turned) corrected according to operation 870 and the image (e.g., the face image when the face faces straight ahead) captured according to operation 890. FIG. 8B shows an example face image of the user 100 when the user's face faces straight ahead. According to an embodiment, the electronic device 101 may analyze the pores and wrinkles included in a first skin analysis area 801. According to an embodiment, the first skin analysis area 801 may be an area analyzed by the electronic device 101 when the face of the user 100 faces straight ahead. FIG. 8C shows an example face image of the user 100 when the user's face has turned right. According to an embodiment, the electronic device 101 may analyze the pores and wrinkles included in a second skin analysis area 802a. The second skin analysis area 802a may be an area analyzed by the electronic device 101 when the face of the user 100 has turned right. FIG. 8D shows an example face image of the user 100 when the user's face has turned left. According to an embodiment, the electronic device 101 may analyze the pores and wrinkles included in a third skin analysis area 802b. The third skin analysis area 802b may be an area analyzed by the electronic device 101 when the face of the user 100 has turned left. According to an embodiment, the electronic device 101 may match the results of analysis of the first skin analysis area 801, the second skin analysis area 802a, and the third skin analysis 802b area. According to an embodiment, when there is an overlap in matching the analysis results, the electronic device 101 may perform analysis result matching, with only one analysis result reflected. By such a process, the electronic device 101 may analyze the pores and wrinkles for the entire facial area.

According to an embodiment, at least some of operations 810 to 890 may be performed by an external electronic device (e.g., a server). For example, according to an embodiment, the electronic device 101 may obtain the user's face image (e.g., a 2D face image) at a request from the external electronic device. According to an embodiment, the electronic device 101 may transmit the obtained face image to the external electronic device. According to an embodiment, the external electronic device may perform operation 810 and operation 820.

According to an embodiment, the external electronic device may transmit information about the light strength determined according to operation 820 to the electronic device 101. According to an embodiment, the electronic device 101 may perform operation 830 using the light strength information received from the external electronic device. According to an embodiment, the external electronic device may perform operation 840 using the user's face image obtained from the electronic device 101. According to an embodiment, the external electronic device may transmit the result of operation 840 (e.g., whether the user's face has turned) to the electronic device 101. According to an embodiment, the electronic device 101 may perform operations 850 and 860 using the light strength information received from the external electronic device. According to an embodiment, the electronic device 101 may transmit the user's face image obtained according to operation 860 to the external electronic device. According to an embodiment, the external electronic device may perform operation 870 using the face image obtained from the electronic device 101. According to an embodiment, the electronic device 101 may capture the user's face image in operation 890. According to an embodiment, the electronic device 101 may transmit the captured image to the external electronic device. According to an embodiment, in operation 880, the external electronic device may match the user's face images obtained according to operations 870 and 890. According to an embodiment, the external electronic device may transmit the matched images to the electronic device 101.

Figure 9A:
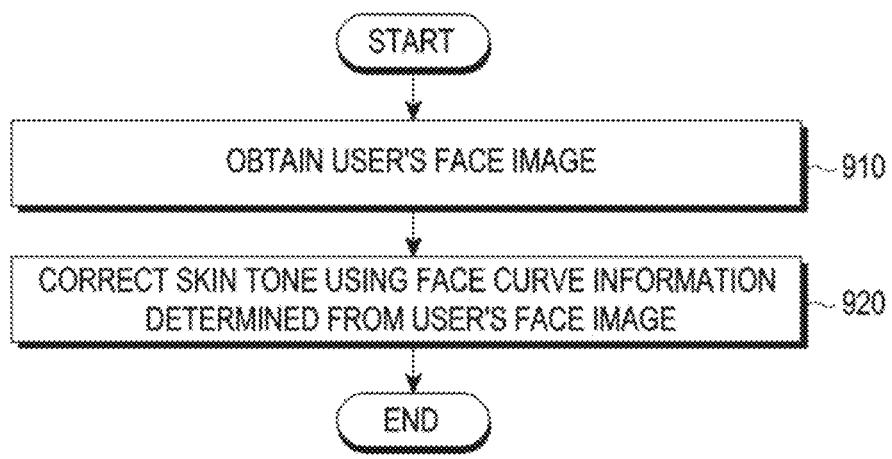
FIG. 9A is a flowchart of a method of correcting (or, modifying) skin tone using face curve information when an electronic device includes a ToF sensor according to an embodiment.
Figure 9B:
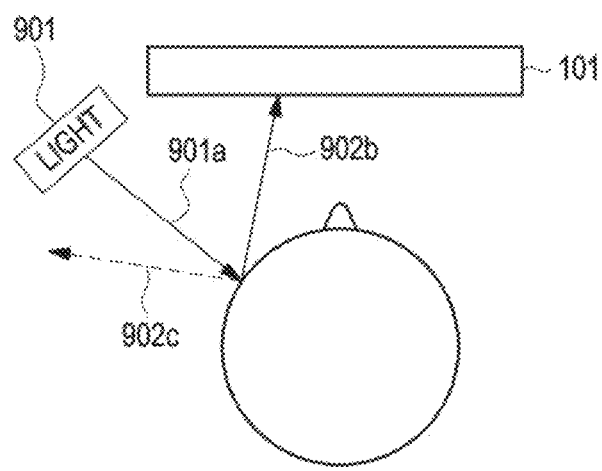
FIG. 9B is a diagram showing light reflecting off a face having large face curves according to an embodiment.
Figure 9C:
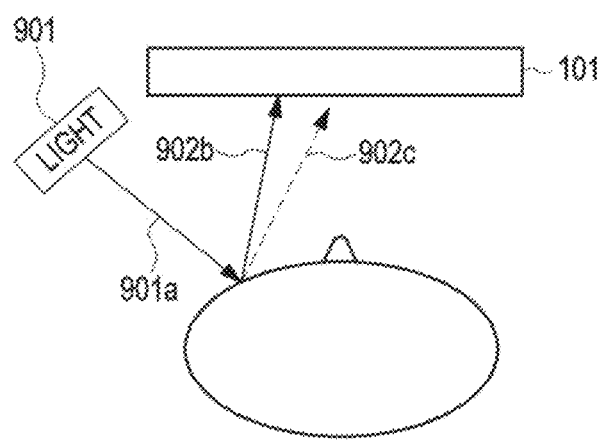
FIG. 9C is a diagram showing light reflecting off a face having small face curves according to an embodiment.

FIGS. 9A, 9B, and 9C show an operation of correcting skin tone using face curve information when an electronic device 101 includes a ToF sensor according to an embodiment.

FIG. 9A is a flowchart of an operation of correcting skin tone using face curve information when an electronic device 101 includes a ToF sensor according to an embodiment. Referring to FIG. 9A, according to an embodiment, the electronic device 101 (e.g., the processor 120) may obtain the user's face image in operation 910.

According to an embodiment, in operation 920, the electronic device 101 (e.g., the processor 120) may correct the skin tone using face curve information determined from the user's face image. The degree of face curves may differ from user to user, and the degree of light reflection may thus be varied. For example, for a user with a larger face curvature, her cheeks may be captured darker (as in the case shown in FIG. 9B) than actual and, for a user with a smaller face curvature, her cheeks may be captured brighter (as in the case shown in FIG. 9C) than actual.

Referring to FIG. 9B, for a user who has larger face curves, part of the incident light 901a output from a light 901 may be reflected by the user's face away from the camera, and the rest thereof may be reflected (902b) to the camera and be incident onto the electronic device 101. However, referring to FIG. 9C, for a user who has smaller face curves, most of the reflections 902c and 902b of the incident light 901a output from the light 901 may be incident to the electronic device 101. Thus, for a user with a larger face curvature, her cheeks may be captured darker than actual and, for a user with a smaller face curvature, her cheeks may be captured brighter than actual.

According to an embodiment, the electronic device 101 may correct the pixel values using Table 7 which includes the correlation between the curvature of at least a portion (e.g., cheeks) of the user's face and the pixel values constituting the face image, thereby correcting the skin tone of the user's face. Thus, it is possible to obtain a face image with a uniform brightness regardless of the curvature of the user's face. According to an embodiment, the electronic device 101 may identify the curvature of the face by obtaining the surface curvature from a portion of the face extracted from, e.g., a 3D face image. Here, curvature may mean the reciprocal of the radius of curvature or the radius of the circle.

TABLE 7

| curvature of face | pixel value |
| --- | --- |
| ... | ... |
| 1.0 | R: 245, G: 20, B: 155 |
| 1.5 | R: 240, G: 20, B: 155 |
| 2.0 | R: 240, G: 25, B: 155 |
| 2.5 | R: 235, G: 25, B: 155 |
| 3.0 | R: 235, G: 30, B: 155 |
| 3.5 | R: 230, G: 30, B: 155 |
| 4.0 | R: 230, G: 35, B: 155 |
| 4.5 | R: 225, G: 35, B: 155 |
| 5.0 | R: 225, G: 40, B: 155 |
| ... | ... |

FIGS. 10A, 10B, 10C, 10D, and 10E show an operation of providing a guide related to a change in body condition as compared with a user's face image.

Figure 10A:
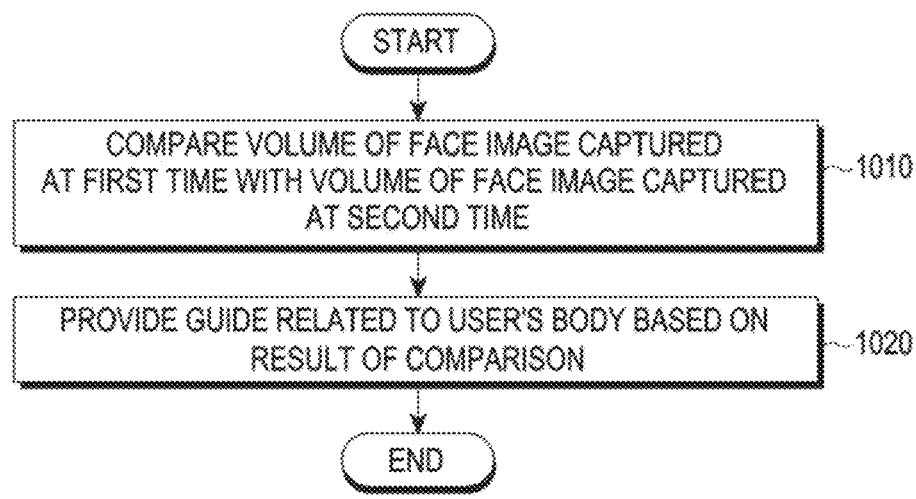
FIG. 10A is a flowchart of a method of providing a guide related to a body condition as compared with a user's face image according to an embodiment.
Figure 10B:
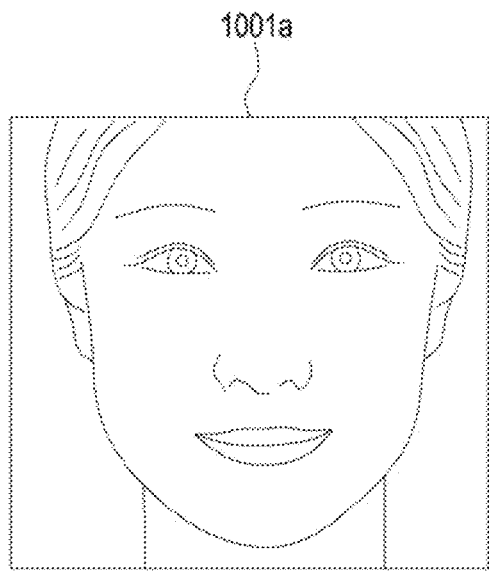
FIG. 10B shows a user's face captured at a previous time.
Figure 10C:
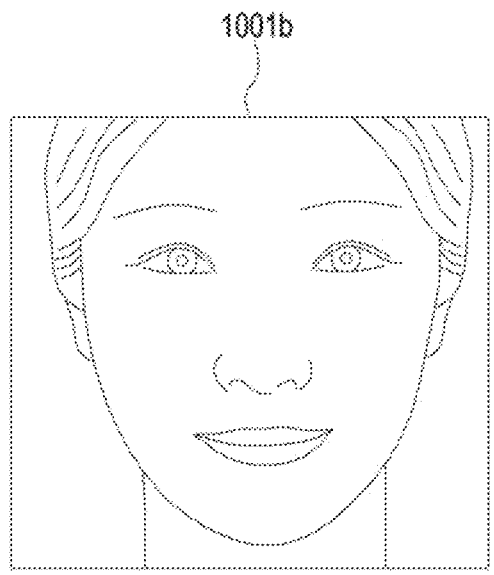
FIG. 10C shows a user's face captured at a present time.
Figure 10D:
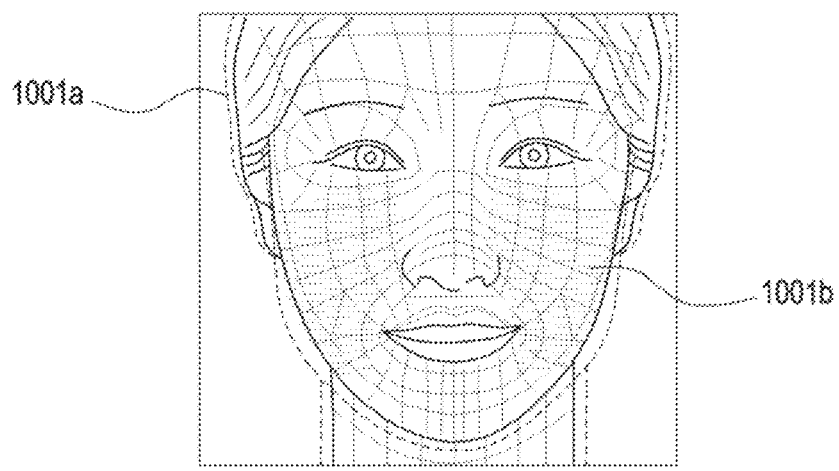
FIG. 10D shows the user's face captured at the previous time overlaid with the user's face captured at the present time for comparing the volumes according to an embodiment.
Figure 10E:
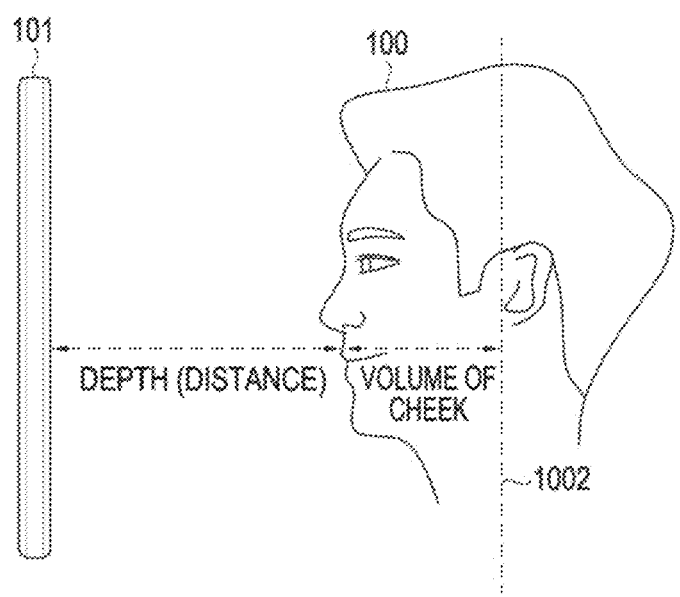
FIG. 10E is a diagram showing a configuration for comparing the volumes of the captured face images based on the user's 3D face shape obtained using the ToF sensor according to an embodiment.

FIG. 10A is a flowchart showing an operation of providing a guide related to a change in body condition as compared with a user's face image. Referring to FIG. 10A, according to an embodiment, the electronic device 101 may compare the volume of a face image captured at a first time (e.g., a past time) with the volume of a face image captured at a second time (e.g., the current time) in operation 1010. Referring to FIG. 10E, according to an embodiment, the electronic device 101 may compare the volumes of the captured face images based on the user's 3D face shape obtained using the ToF sensor. According to an embodiment, the electronic device 101 may determine a relative volume of a specific area (e.g., the user's cheek) of the user's face by summating the lengths of the distance between the electronic device 101 and a virtual line 1002, except for the depth (e.g., the distance between the electronic device 101 and the user 100), for the specific area of the user's face. According to an embodiment, the distance between the electronic device 101 and the virtual line 1002 may be determined to be an arbitrary value or may be defined as a variable. FIG. 10B shows a face 1001a captured at a first time. FIG. 10C shows a face 1001b captured at a second time which is after the first time. Referring to FIG. 10D, according to an embodiment, the electronic device 101 may overlay the face 1001a captured at the first time and the face 1001b captured at the second time and compare the volumes for the specific area, thereby comparing the volumes of the face image to be captured. According to an embodiment, the electronic device 101 may determine whether the volume has increased or decreased (e.g., 5% increase in volume) during a time passage after a specific time.

According to an embodiment, the electronic device 101 may provide a guide related to the user's body based on the results of comparison in operation 1020. According to an embodiment, when the specific time period is less than, e.g., one week, and the volume of the cheek is increased by 5%, the electronic device 101 may provide various solutions for reducing swelling, along with a message saying, "5% swollen as compared with the past." According to an embodiment, when the specific time period is, e.g., one week or more, and the volume of the cheek is increased by 5%, the electronic device 101 may provide a diet guide, along with a message saying, "5% increase in face weight as compared with the past."

Figure 11A:
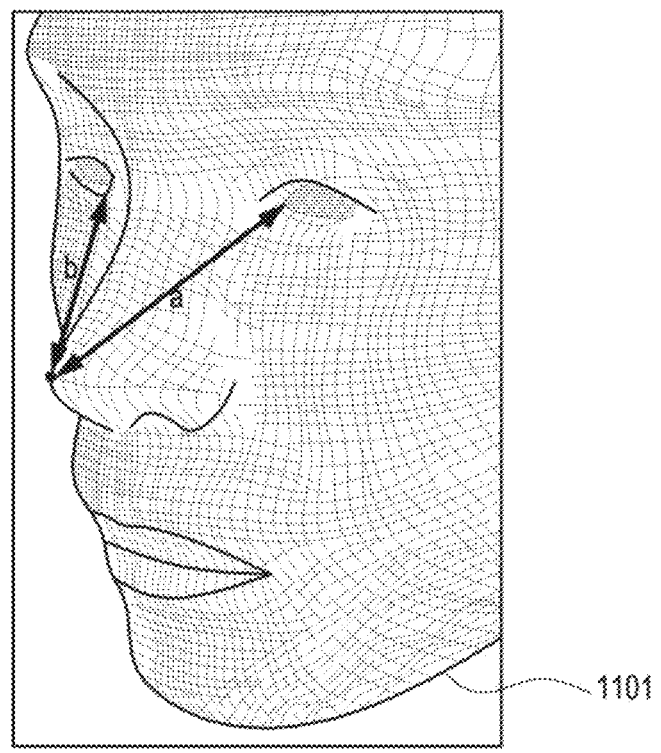
FIG. 11A is a diagram showing a method of correcting the size of pores and/or the length of wrinkles using a 3D shape of a user's face according to an embodiment.
Figure 11B:
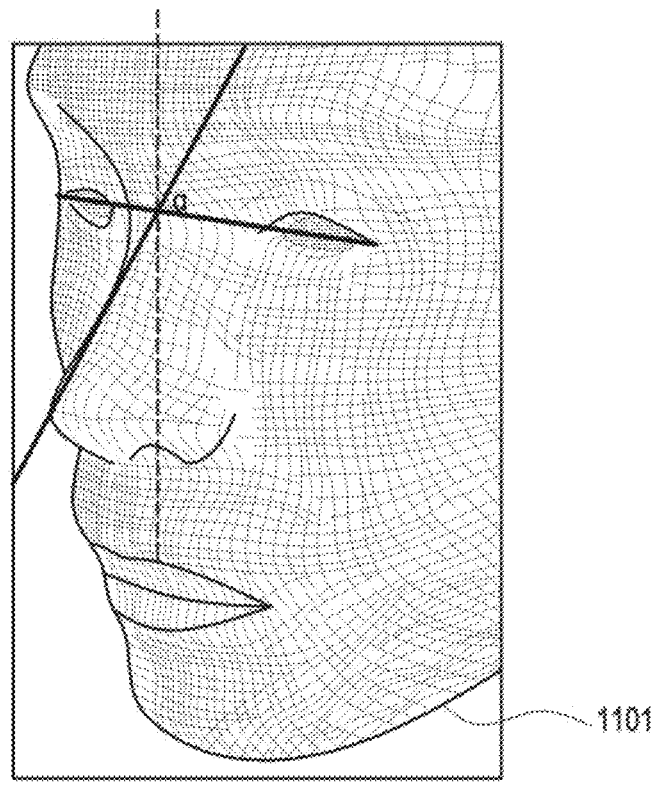
FIG. 11B is a diagram showing a line connecting the outer corners of the eyes as not perpendicular to a line connecting the nose tip and the area between the eyebrows indicating the face is angled according to an embodiment.
Figure 11C:
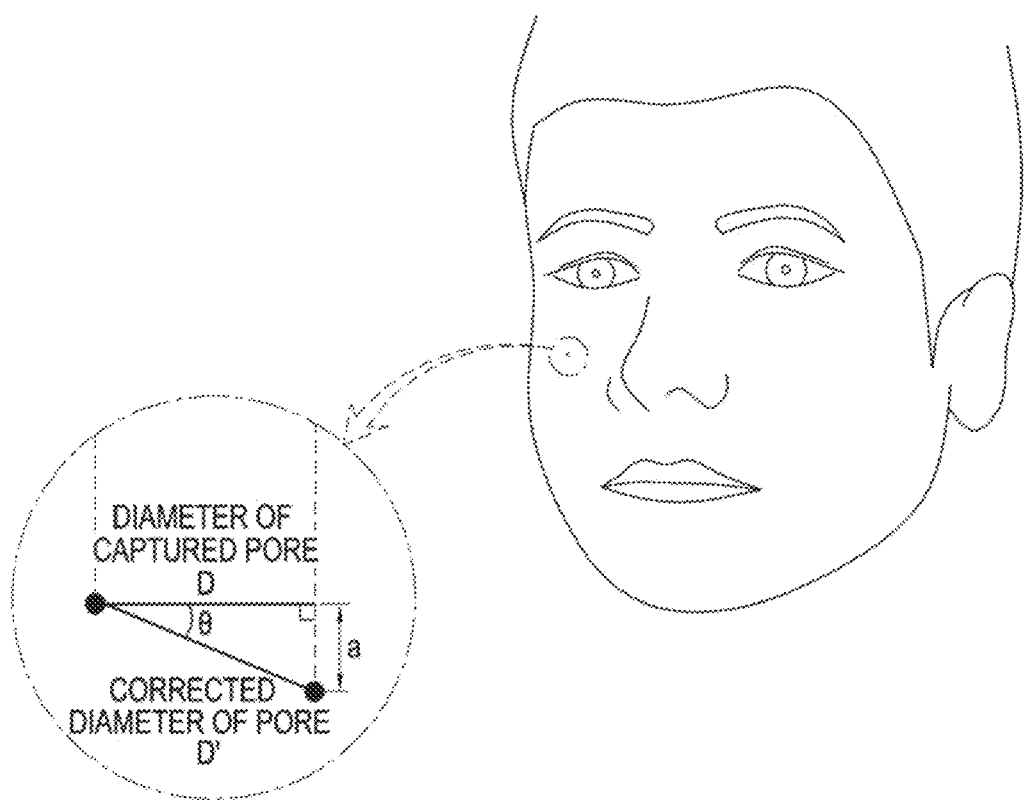
FIG. 11C is a diagram showing a method for correcting the diameter of the pores captured when the face is angled into the diameter of the pores captured when the face faces straight ahead according to an embodiment.

FIGS. 11A, 11B, and 11C show diagrams of an operation of correcting the size of pores and/or the length of wrinkles using a 3D shape 1101 of a user's face.

Referring to FIG. 11A, according to an embodiment, the electronic device 101 may compare the length of the right feature point connection line a with the length of the left feature point connection line b from the 3D shape 1101 of the user's face. According to an embodiment, the electronic device 101 may determine whether the user's face has turned and, if so, the angle of turn, by comparing the length of the right feature point connection line a with the length of the left feature point connection line b. Referring to FIG. 11B, according to an embodiment, unless the line connecting the outer corners of the eyes is perpendicular to the line connecting the nose tip and the part between the eyebrows, the electronic device 101 may determine that the user's face has turned.

Referring to FIG. 11C, according to an embodiment, the electronic device 101 may identify depth information (e.g., the distance between the electronic device 101 and each feature point) corresponding to both ends of a specific pore. The electronic device 101 may identify the length of the distance deviation that is caused as the face turns, using the difference in depth information corresponding to both ends of the pore. According to an embodiment, the electronic device 101 may identify the length of the diameter D of the pore captured, by calculating the distance between the feature points using the 2D face image. According to an embodiment, the electronic device 101 may identify the user's pores (or wrinkles) via feature point analysis. According to an embodiment, the electronic device 101 may identify the angle θ of turn of the face. According to an embodiment, the electronic device 101 may correct the diameter of the pores captured into the diameter of the pores captured when the face faces straight ahead using Equation 3 and/or Equation 4.

Figure 12:
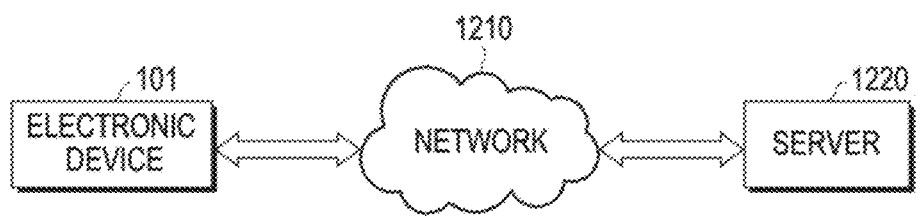
FIG. 12 shows an electronic device in a network environment according to an embodiment.

FIG. 12 is a diagram showing an environment including the electronic device 101, a network 1210, and a server 1220. Referring to FIG. 12, according to an embodiment, the electronic device 101 may be connected with a server 1220 via a network 1210. According to an embodiment, the network 1210 may include a remote communication network, such as a cellular network, the Internet, or a computer network (e.g., local area network (LAN) or wide area network (WAN). According to an embodiment, the server 1220 may have a similar configuration to that of the electronic device 101. For example, according to an embodiment, the server 1220 may include at least one of at least one processor, at least one communication module, and at least one memory. According to an embodiment, at least one processor may execute, for example, software to control at least one other component (e.g., a hardware or software component) of the server 1220 connected with the at least one processor, and may perform various data processing or computation. According to an embodiment, at least one communication module included in the server 1220 may support an establishment of a wireless communication channel or a direct (e.g., wired) communication channel between the server 1220 and an external electronic device (e.g., the electronic device 101) and communication via the established communication channel. According to an embodiment, at least one memory included in the server 1220 may store various data used by at least one component (e.g., at least one processor 120) of the server 1220. The various data may include, for example, software and input data or output data for a command related thereto. According to an embodiment, at least one memory may include a volatile memory or a non-volatile memory.

Figure 13:
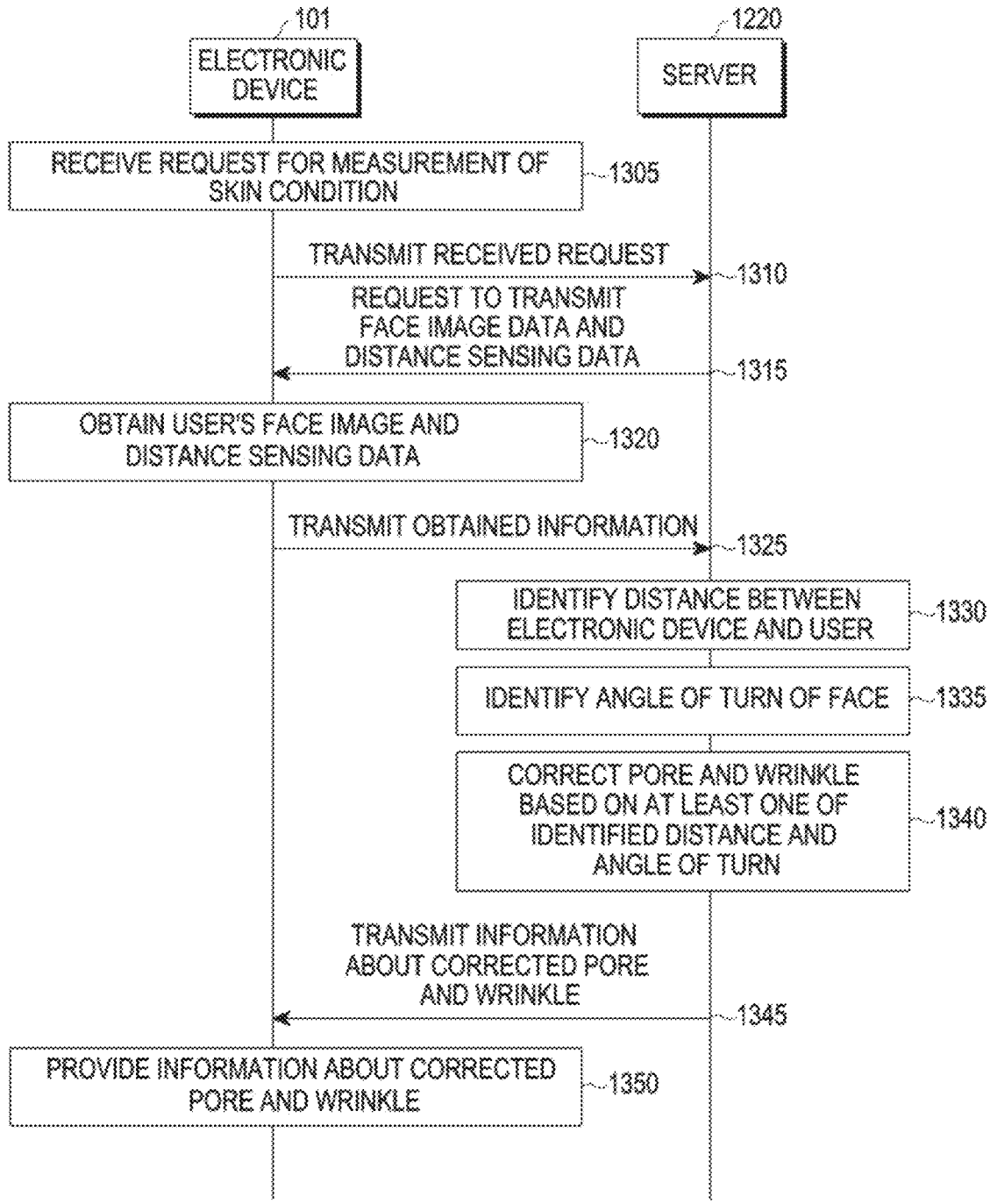
FIG. 13 is a sequence diagram showing a portion of the operations of FIG. 5C being performed by an external electronic device (e.g., a server) according to an embodiment.

FIG. 13 is a sequence diagram of an example in which at least some of the operations described above in connection with FIG. 5C are performed by an external electronic device (e.g., a server). The description made in connection with FIG. 5C may apply to various operations described in connection with FIG. 13. According to an embodiment, the electronic device 101 may receive a request for measuring skin condition in operation 1305. According to an embodiment, the electronic device 101 may receive the skin condition measurement request from the user via various applications. According to an embodiment, the electronic device 101 may transmit the received request to the server 1220 in operation 1310. According to an embodiment, the server 1220 may request the electronic device 101 to transmit face image data and distance sensing data in operation 1315. According to an embodiment, the electronic device 101 may obtain the user's face image (e.g., 2D face image) and distance sensing data based on a request from the server 1220 in operation 1320. According to an embodiment, the electronic device 101 may transmit the obtained information (e.g., the user's face image (e.g., 2D face image) and distance sensing data) to the server 1220 in operation 1325. According to an embodiment, the server 1220 may identify the distance between the user and the electronic device 101 using the received information in operation 1330. According to an embodiment, the server 1220 may identify the angle of turn of the face using the received information in operation 1335. According to an embodiment, the server 1220 may correct the pores and wrinkles based on at least one of the identified distance and angle of turn in operation 1340. According to an embodiment, the server 1220 may transmit information about the corrected pores and wrinkles to the electronic device 101 in operation 1345. According to an embodiment, the electronic device 101 may provide information about the corrected pores and wrinkles in operation 1350.

Figure 14:
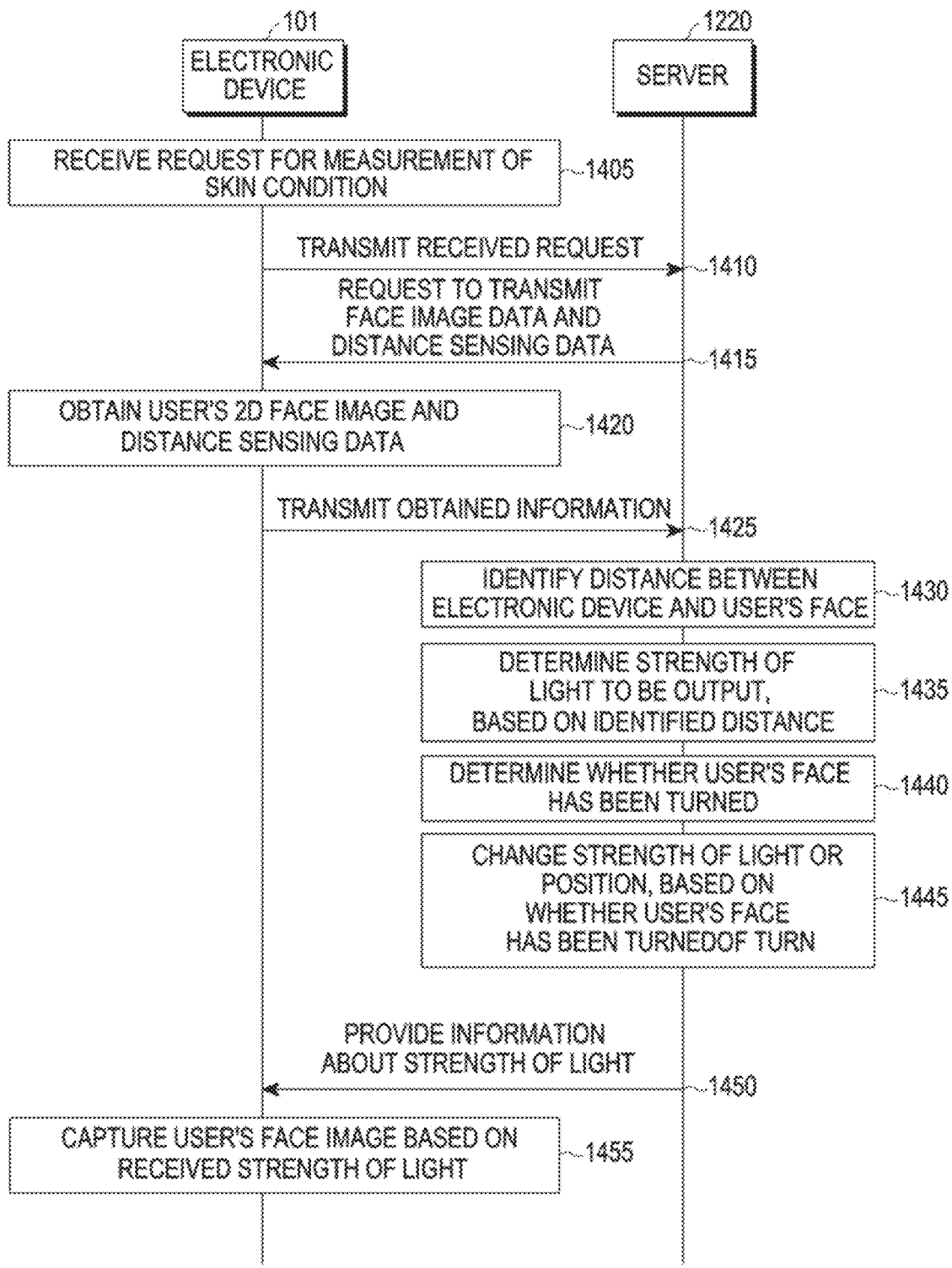
FIG. 14 is a sequence diagram showing a portion of the operations of FIG. 6A being performed by an external electronic device (e.g., a server) according to an embodiment.

FIG. 14 is a sequence diagram of an example in which at least some of the operations described above in connection with FIG. 6A are performed by an external electronic device (e.g., a server). The description made in connection with FIG. 6A may apply to various operations described in connection with FIG. 14. According to an embodiment, the electronic device 101 may receive a request for measuring skin condition in operation 1405. According to an embodiment, the electronic device 101 may receive the skin condition measurement request from the user via various applications. According to an embodiment, the electronic device 101 may transmit the received request to the server 1220 in operation 1410. According to an embodiment, the server 1220 may request the electronic device 101 to transmit face image data and distance sensing data in operation 1415. According to an embodiment, the electronic device 101 may obtain the user's face image (e.g., 2D face image) and distance sensing data based on a request from the server 1220 in operation 1420. According to an embodiment, the electronic device 101 may transmit the obtained information (e.g., the user's face image (e.g., 2D face image) and distance sensing data) to the server 1220 in operation 1425. According to an embodiment, the server 1220 may identify the distance between the user's face and the electronic device using the received information in operation 1430. According to an embodiment, the server 1220 may determine the strength of the light to be output, based on the identified distance in operation 1435. According to an embodiment, the server 1220 may determine whether the user's face has turned, using the received information, in operation 1440. According to an embodiment, the server 1220 may change or maintain the strength of light based on the result of determination, in operation 1445. According to an embodiment, the server 1220 may provide information about the light strength to the electronic device 101 in operation 1450. According to an embodiment, the electronic device 101 may capture the user's face image based on the received light strength information in operation 1455.

Figure 15:
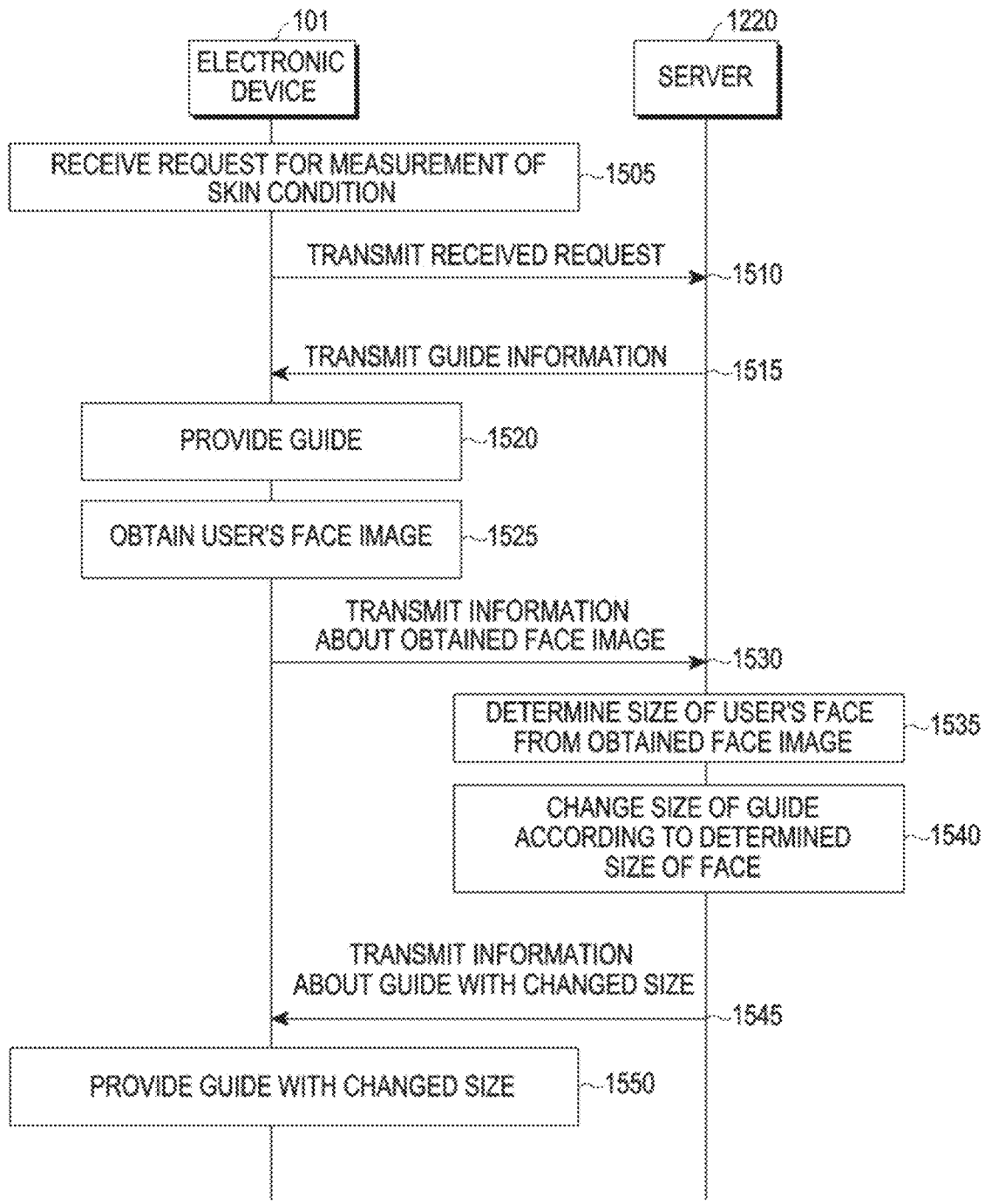
FIG. 15 is a sequence diagram showing a portion of the operations of FIG. 7A being performed by an external electronic device (e.g., a server) according to an embodiment.

FIG. 15 is a sequence diagram of an example in which at least some of the operations described above in connection with FIG. 7A are performed by an external electronic device (e.g., a server). The description made in connection with FIG. 7A may apply to various operations described in connection with FIG. 15. According to an embodiment, the electronic device 101 may receive a request for measuring skin condition in operation 1505. According to an embodiment, the electronic device 101 may receive the skin condition measurement request from the user via various applications. According to an embodiment, the electronic device 101 may transmit the received request to the server 1220 in operation 1510. According to an embodiment, the server 1220 may transmit guide information (e.g., guide size) for obtaining the user's face image to the electronic device 101 in operation 1515. According to an embodiment, the electronic device 101 may provide a guide using the received guide information in operation 1520. According to an embodiment, the electronic device 101 may obtain the user's face image in operation 1525. According to an embodiment, the electronic device 101 may transmit information about the obtained face image to the server 1220 in operation 1530. According to an embodiment, the server 1220 may determine the size of the user's face in the obtained face image in operation 1535. According to an embodiment, the server 1220 may change the size of the guide according to the determined face size in operation 1540. According to an embodiment, the server 1220 may transmit information about the resized guide to the electronic device 101 in operation 1545. According to an embodiment, the electronic device 101 may provide a guide with the changed size in operation 1550.

Figure 16:
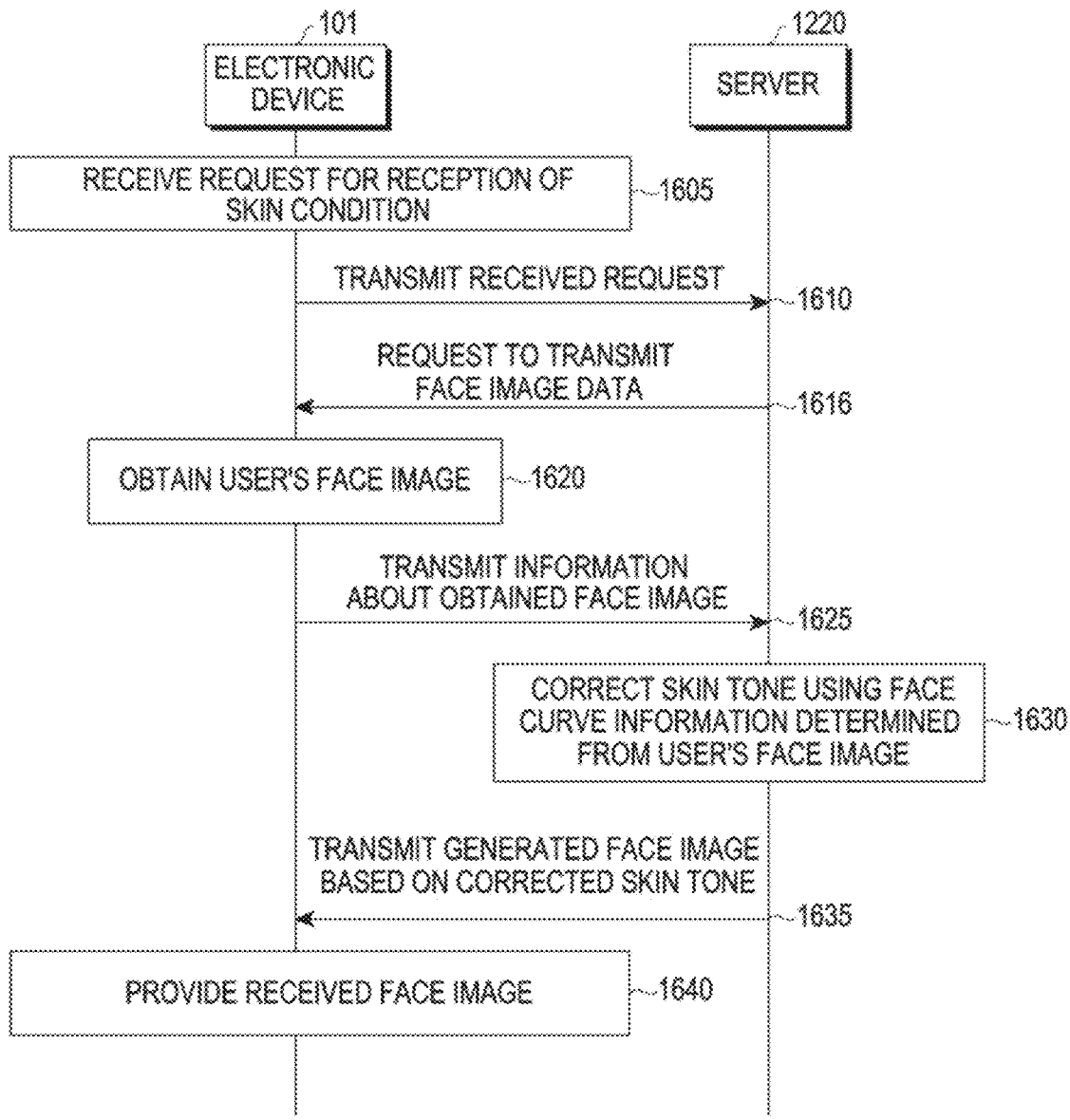
FIG. 16 is a sequence diagram showing a portion of the operations of FIG. 9A being performed by an external electronic device (e.g., a server) according to an embodiment.

FIG. 16 is a sequence diagram of an example in which at least some of the operations described above in connection with FIG. 9A are performed by an external electronic device (e.g., a server). The description made in connection with FIG. 9A may apply to various operations described in connection with FIG. 16. According to an embodiment, the electronic device 101 may receive a request for measuring skin condition in operation 1605. According to an embodiment, the electronic device 101 may receive the skin condition measurement request from the user via various applications. According to an embodiment, the electronic device 101 may transmit the received request to the server 1220 in operation 1610. According to an embodiment, the server 1220 may send a request for transmission of face image data to the electronic device 101 in response to the request received according to operation 1610, in operation 1615. According to an embodiment, the electronic device 101 may obtain the user's face image in operation 160. According to an embodiment, the electronic device 101 may transmit information about the obtained face image to the server 1220 in operation 1625 According to an embodiment, the electronic device 101 may correct the skin tone using face curve information determined from the user's face image, in operation 1630. According to an embodiment, the electronic device 101 may transmit a face image generated based on the corrected skin tone to the electronic device 101 in operation 1635. According to an embodiment, the electronic device 101 may provide the received face image in operation 1640.

Figure 17:
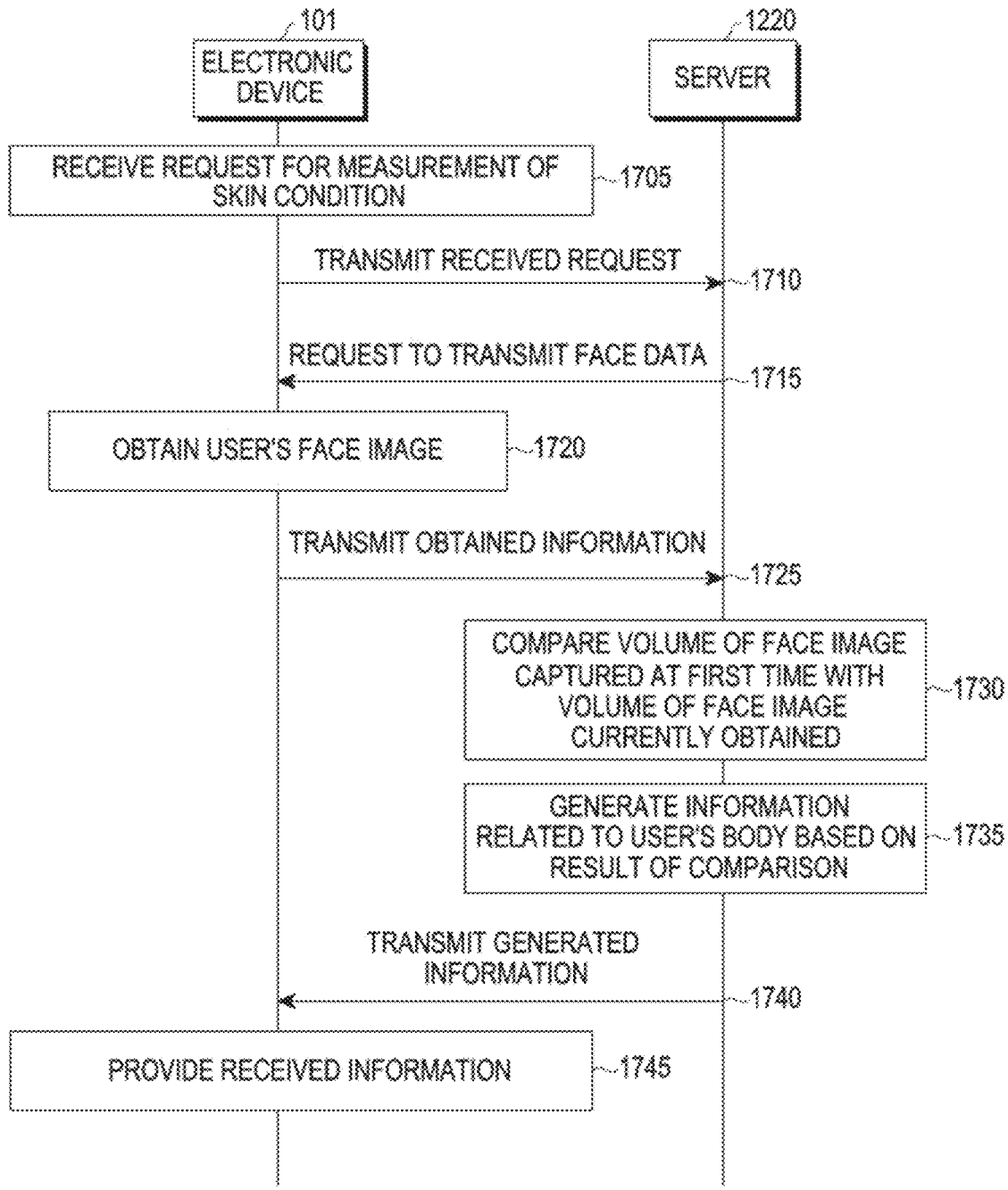
FIG. 17 is a sequence diagram showing a portion of the operations of FIG. 10A being performed by an external electronic device (e.g., a server) according to an embodiment.

FIG. 17 is a sequence diagram of an example in which at least some of the operations described above in connection with FIG. 10A are performed by an external electronic device (e.g., a server). The description made in connection with FIG. 10 may apply to various operations described in connection with FIG. 17. According to an embodiment, the electronic device 101 may receive a request for measuring skin condition in operation 1705. According to an embodiment, the electronic device 101 may receive the skin condition measurement request from the user via various applications. According to an embodiment, the electronic device 101 may transmit the received request to the server 1220 in operation 1710. According to an embodiment, the server 1220 may send a request for transmission of face image data to the electronic device 101 in response to the request received according to operation 1710, in operation 1715. According to an embodiment, the electronic device 101 may obtain the user's face image in operation 1720. According to an embodiment, the electronic device 101 may transmit information about the obtained face image to the server 1220 in operation 1725 According to an embodiment, the server 1220 may compare the volume of the face image captured at a first time with the volume of the face image currently obtained, in operation 1730. According to an embodiment, the server 1220 may generate information related to the user's body based on the result of comparison of operation 1730, in operation 1735. According to an embodiment, the server 1220 may transmit the generated information to the electronic device 101 in operation 1740. According to an embodiment, the electronic device 101 may provide the information received from the server 1220 in operation 1745.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment, the electronic device is not limited to the above-listed embodiments.

Various embodiments as set forth herein may be implemented as software including one or more instructions that are stored in a storage medium readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments, it is possible to obtain the same skin information as is obtained at a distance where accurate skin analysis may be optimized even when the distance between the user's face and the electronic device performing skin analysis is larger or smaller than the distance at which precise skin analysis is optimized.

According to various embodiments, it is possible to obtain the same skin information as is obtained when the user's face faces straight ahead at the electronic device, even when the user's face faces a certain angle away from the electronic device, rather than facing straight at the electronic device.

The effects set forth herein are not limited thereto, and it is apparent to one of ordinary skill in the art that various effects may be disclosed herein.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a display;
a distance sensor including a time-of-flight (ToF) sensor, wherein the ToF sensor includes a light source module and a light receiving module, the light source module including a left light source and a right light source;
a camera; and
at least one processor configured to:
obtain a two-dimensional (2D) face image of a user via the camera and obtain distance sensing data via the ToF sensor;
identify a distance between a face of the user and the electronic device, and a rotation angle and a rotation direction of the face of the user with respect to the electronic device, using the obtained 2D face image and the obtained distance sensing data;
modify at least a part of the 2D face image based on the identified distance and the identified rotation angle; and
provide information about at least the part of the modified 2D face image via the display,
wherein the at least one processor is further configured to:
identify sizes of a pore and a wrinkle in the 2D face image, the pore and the wrinkle being included in the 2D face image;
correct the sizes of the pore and the wrinkle, based on a correction coefficient corresponding to the identified distance; and
re-correct the corrected sizes of the pore and the wrinkle, based on the identified rotation angle,
wherein the at least one processor is further configured to:
determine, based on the identified distance, a strength of a light to be outputted by the left light source and the right light source;
based on identifying, by the identified rotation angle and the identified rotation direction, that the face turns right, decrease the determined strength of a light outputted from the left light source and increase the determined strength of a light outputted from the right light source; and
based on identifying, by the identified rotation angle and the identified rotation direction, that the face turns left, decrease the determined strength of the light outputted from the right light source and increase the determined strength of the light outputted from the left light source,
wherein the at least one processor is further configured to:
display, through the display, a guide with a first size corresponding to an average face size;
identify a size of the face, from the obtained 2D face image;
based on the size of the face being different from the average face size, change, based on the identified size of the face, a size of the guide from the first size to a second size different from the first size; and
display, through the display, the guide with the second size.

2. The electronic device of claim 1, wherein the distance between the face of the user and the electronic device corresponds to a distance between the electronic device and a nose tip of the face of the user.

3. The electronic device of claim 1, wherein the at least one processor is further configured to:
obtain a three-dimensional (3D) shape of the face of the user using the distance sensing data obtained via the ToF sensor; and
modify a brightness of the obtained 2D face image based on the 3D shape of the face of the user.

4. The electronic device of claim 3, wherein the at least one processor is further configured to identify a volume of the face of the user based on the 3D shape of the face of the user and provide a predetermined guide based on the identified volume.

5. A method for controlling an electronic device, the method comprising:
obtaining a two-dimensional (2D) face image of a user via a camera of the electronic device;
obtaining distance sensing data via a distance sensor of the electronic device, wherein the distance sensor includes a time-of-flight (ToF) sensor, wherein the ToF sensor includes a light source module and a light receiving module, the light source module including a left light source and a right light source;
identifying a distance between a face of the user and the electronic device, and a rotation angle and a rotation direction of the face of the user with respect to the electronic device, using the obtained 2D face image and the obtained distance sensing data;
modifying at least a part of the 2D face image based on the identified distance and the identified rotation angle; and
providing information about at least the part of the modified 2D face image via a display,
wherein the method further comprises:
identifying sizes of a pore and a wrinkle in the 2D face image, the pore and the wrinkle being included in the 2D face image;
correcting the sizes of the pore and the wrinkle, based on a correction coefficient corresponding to the identified distance; and
re-correcting the corrected sizes of the pore and the wrinkle, based on the identified rotation angle,
wherein the method further comprises:
determining, based on the identified distance, a strength of a light to be outputted by the left light source and the right light source;
based on identifying, by the identified rotation angle and the identified rotation direction, that the face turns right, decreasing the determined strength of a light outputted from the left light source and increasing the determined strength of a light outputted from the right light source; and
based on identifying, by the identified rotation angle and the identified rotation direction, that the face turns left, decreasing the determined strength of the light outputted from the right light source and increasing the determined strength of the light outputted from the left light source,
wherein the method further comprises:
displaying, through the display, a guide with a first size corresponding to an average face size;
identifying a size of the face, from the obtained 2D face image;
based on the size of the face being different from the average face size, changing, based on the identified size of the face, a size of the guide from the first size to a second size different from the first size; and displaying, through the display, the guide with the second size.

6. The method of claim 5, wherein the distance between the face of the user and the electronic device corresponds to a distance between the electronic device and a nose tip of the face of the user.

7. The method of claim 5, further comprising:
obtaining a three-dimensional (3D) shape of the face of the user using the distance sensing data obtained via the ToF sensor; and
modifying a brightness of the obtained 2D face image using the 3D shape of the face of the user.

8. The method of claim 7, further comprising:
identifying a volume of the face of the user using the 3D shape of the face of the user; and
providing a predetermined guide based on the identified volume.

* * * * *